US008576679B2

(12) United States Patent
Nonaka et al.

(10) Patent No.: US 8,576,679 B2
(45) Date of Patent: Nov. 5, 2013

(54) APPARATUS AND METHOD FOR USING CONTENT ON AN OPTICAL DISC HAVING PLURAL PARTIAL AREAS FOR RECORDING CONTROL INFORMATION INDICATING THAT THE USE OF THE CONTENT IS NOT PERMITTED

(75) Inventors: Masao Nonaka, Osaka (JP); Natsume Matsuzaki, Osaka (JP)

(73) Assignee: Panasonic Corporation, Osaka (JP)

( * ) Notice: Subject to any disclaimer, the term of this patent is extended or adjusted under 35 U.S.C. 154(b) by 150 days.

(21) Appl. No.: 13/319,429

(22) PCT Filed: Mar. 25, 2011

(86) PCT No.: PCT/JP2011/001785
§ 371 (c)(1),
(2), (4) Date: Nov. 8, 2011

(87) PCT Pub. No.: WO2011/121964
PCT Pub. Date: Oct. 6, 2011

(65) Prior Publication Data
US 2012/0051203 A1    Mar. 1, 2012

(30) Foreign Application Priority Data
Mar. 29, 2010 (JP) ................................. 2010-074665

(51) Int. Cl.
*G11B 15/52* (2006.01)
(52) U.S. Cl.
USPC .................................... 369/47.15; 369/53.21
(58) Field of Classification Search
None
See application file for complete search history.

(56) References Cited

U.S. PATENT DOCUMENTS

| | | | | |
|---|---|---|---|---|
| 7,028,011 | B1 * | 4/2006 | Ha et al. | 705/57 |
| 7,917,958 | B2 * | 3/2011 | Suh et al. | 726/26 |
| 2004/0246854 | A1 * | 12/2004 | Kim et al. | 369/53.21 |
| 2007/0104054 | A1 | 5/2007 | Senshu | |
| 2011/0126279 | A1 | 5/2011 | Senshu | |

FOREIGN PATENT DOCUMENTS

| | | |
|---|---|---|
| JP | 2001-332019 | 11/2001 |
| JP | 2005-149677 | 6/2005 |
| JP | 2005-243120 | 9/2005 |
| JP | 2007-133608 | 5/2007 |

OTHER PUBLICATIONS

International Search Report issued Jun. 14, 2011 in International (PCT) Application No. PCT/JP2011/001785.

* cited by examiner

*Primary Examiner* — Paul Huber
(74) *Attorney, Agent, or Firm* — Wenderoth, Lind & Ponack, L.L.P.

(57) ABSTRACT

The present invention provides an apparatus for correctly controlling content recorded on an optical disc. An apparatus 600 for using content recorded on an optical disc 601, wherein the optical disc 601 includes a control information area 602 composed of partial areas 603a-603n, each being for recording control information indicating that use of the content is not permitted, the apparatus 600 comprises: a position information holding unit 612 holding therein position information indicating one of the partial areas 603a-603n that is allocated for the apparatus 600 to record the control information; a reading unit 613 reading information within the control information area 602; a judgment unit 614 judging whether use of the content is permitted, with use of the information read by the reading unit 613 and the position information; and a usage control unit 615 using the content when use of the content is judged to be permitted.

24 Claims, 24 Drawing Sheets

FIG. 10
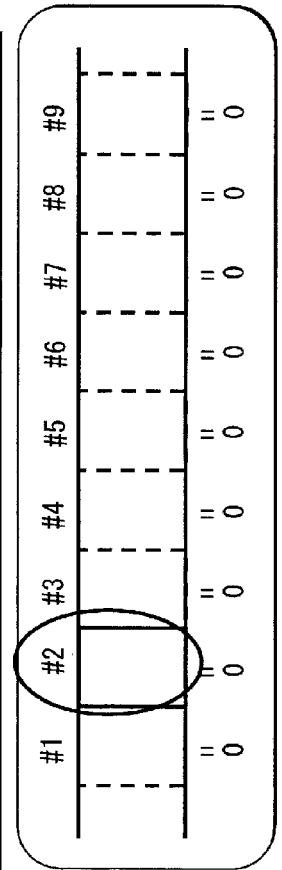
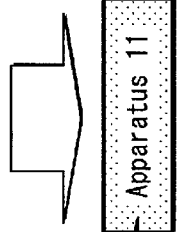
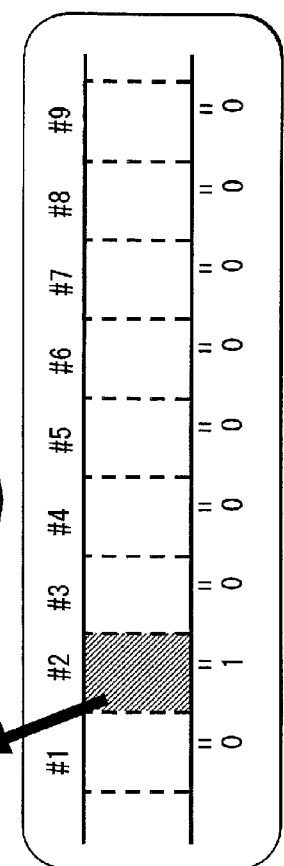

APPARATUS AND METHOD FOR USING CONTENT ON AN OPTICAL DISC HAVING PLURAL PARTIAL AREAS FOR RECORDING CONTROL INFORMATION INDICATING THAT THE USE OF THE CONTENT IS NOT PERMITTED

This application is a 371 of PCT/JP2011/001785, filed Mar. 25, 2011.

TECHNICAL FIELD

The present invention relates to an apparatus for using content recorded on an optical disc.

BACKGROUND ART

There is a demand for installing content recorded on an optical disc into an apparatus with a built-in hard disk, and thereby using the content only with the apparatus without use of the optical disc. In this case, it is necessary to protect the rights of a copyright holder of the content. To do so, the use of the content installed in the apparatus needs to be permitted, whereas the use of the content recorded on the optical disc needs to be prohibited.

Patent Literature 1 discloses a copy control method in the case of recording content onto a write-once optical disc, which is writable only once, and distributing the content. Specifically, a recording apparatus records, onto an optical disc, content to which a confidential flag is added. Then, a playback apparatus judges whether the confidential flag is added to the content recorded on the optical disc. If judging that the confidential flag is added to the content, the playback apparatus does not permit copying of the content. In this way, copying of the content on the optical disc is controlled.

The manufacturing cost of a write-once optical disc is higher than that of a playback-only optical disc, since the manufacturing process of the write-once optical disc is more complicated than that of the play-back only optical disc. For this reason, it is preferable to use playback-only optical discs, in a case of distributing a large number of contents. Accordingly, a study has been conducted for a mechanism for additionally writing data onto a playback-only optical disc, and thereby prohibiting the use of the content on the playback-only optical disc.

BCA (Burst Cutting Area) technology is well-known as a method for additionally write data onto a ROM disc, which is a play-back only optical disc. According to BCA technology, data is recorded with use of a YAG laser, which is a powerful infrared laser. Specifically, the YAG laser is used to burn a reflective film of a lead-in area and create a hole in the reflective film. Such technology is generally used when a unique number is provided for an optical disc, and is mainly employed in manufacturing factories.

CITATION LIST

Patent Literature

Patent Literature 1: Japanese Patent Application Publication No. 2001-332019

SUMMARY OF INVENTION

Technical Problem

In order for a household apparatus used by a general user to use a laser to create a hole in a reflective film of a playback-only optical disc, it is necessary to irradiate the reflective film with the laser for a relatively long time. In the case of a household apparatus, a power cut easily occurs by a user accidentally or intentionally pulling out the plug or by a power failure.

When a power cut occurs, there is a possibility that processing may be interrupted while an optical disc is being irradiated with a laser, or that the processing may be terminated before content on the optical disc is available for use by the household apparatus. In such cases, the optical disc and the household apparatus may be placed in unexpected states, and usage control of the content may not be performed correctly.

The present invention has been achieved in view of the above problems, and an aim thereof is to provide an apparatus, for using (playback, install, etc.) content recorded on an optical disc, that correctly performs usage control of the content on the optical disc even if processing is interrupted by a power cut, a method for using content, a computer program, a recording medium, and an integrated circuit.

Solution to Problem

In order to solve the above problems, one aspect of the present invention is an apparatus for using content recorded on an optical disc, wherein the optical disc includes a control information area that is composed of a plurality of partial areas, each being for recording control information indicating that use of the content is not permitted, the apparatus comprises: a position information holding unit holding therein position information indicating one of the partial areas that is allocated for the apparatus to record the control information; a reading unit configured to read information within the control information area; a judgment unit configured to judge whether use of the content is permitted, with use of the information read by the reading unit and the position information; and a usage control unit configured to use the content when use of the content is judged to be permitted.

Advantageous Effects of Invention

According to the stated structure, the position at which the control information is to be recorded is determined in advance in the apparatus. This enables associating the control information recorded on the optical disc with the apparatus. Accordingly, by checking the position information of the apparatus and the information within the control information area of the optical disc, the apparatus can distinguish whether the optical disc is new and is to be used for the first time, whether the optical disc has been used by another apparatus, whether the optical disc is the same as that previously used by the apparatus itself, etc.

Suppose here that although the control information is recorded on the optical disc, installing processing has been interrupted by a power cut, resulting in use of the content in the apparatus being still not permitted. In this case, since the control information is recorded on the optical disc, the apparatus is likely to determine that the content has already been installed into another apparatus and, accordingly, to judge that use of the content is not permitted. This is because if a single content is used by multiple apparatuses, the rights of a copyright holder of the content cannot be protected. For this reason, in the aforementioned case, namely in the case where although the control information is recorded on the optical disc, use of the content in the apparatus is still not permitted due to a power cut, neither the content on the optical disc nor the content recorded in the apparatus is permitted for use.

However, according the present invention, the apparatus judges whether the control information was recorded on the optical disc by the apparatus itself or by another apparatus. Therefore, if judging that the control information was recorded by the apparatus itself, the apparatus can change the state of the content to a usage permission state where use of the content is permitted, and thereby correctly complete the install processing.

As described above, the present invention can correctly perform usage control of content even if a power cut occurs during processing.

BRIEF DESCRIPTION OF DRAWINGS

FIG. 10 shows an operation example in a case where the optical disc 10 is new and is used in the apparatus 11 for the first time.

DESCRIPTION OF EMBODIMENTS

Figure 1:
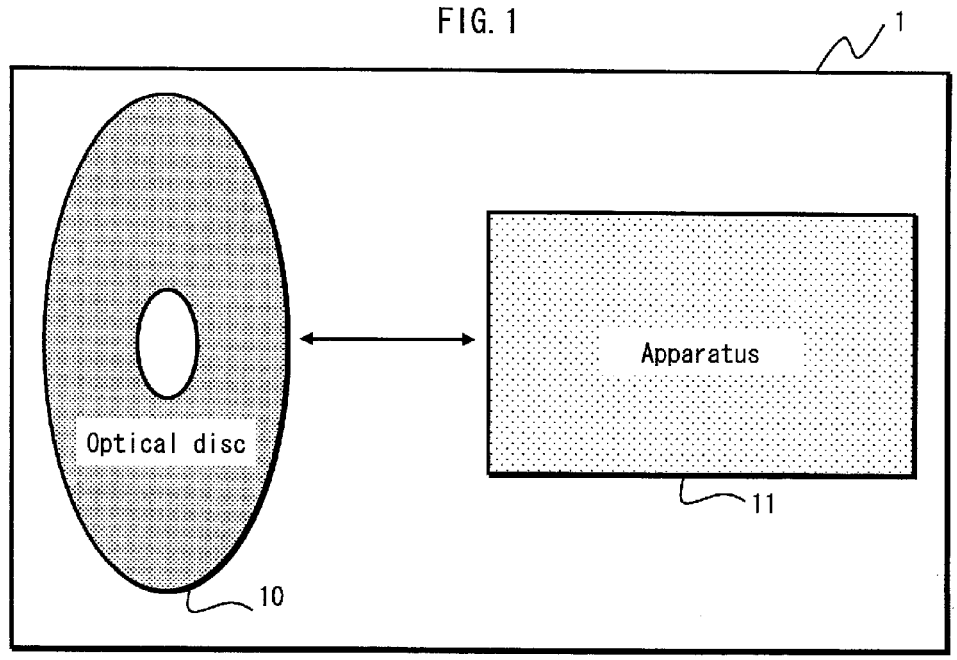
FIG. 1 shows a structure of a content control system 1 according to Embodiment 1 of the present invention.

A first aspect of the present invention is an apparatus for using content recorded on an optical disc, wherein the optical disc includes a control information area that is composed of a plurality of partial areas, each being for recording control information indicating that use of the content is not permitted, the apparatus comprises: a position information holding unit holding therein position information indicating one of the partial areas that is allocated for the apparatus to record the control information; a reading unit configured to read information within the control information area; a judgment unit configured to judge whether use of the content is permitted, with use of the information read by the reading unit and the position information; and a usage control unit configured to use the content when use of the content is judged to be permitted.

According to a second aspect of the present invention, the apparatus may have a structure in which the judgment unit judges that use of the content is not permitted when the control information is recorded in any of the partial areas other than the partial area indicated by the position information.

When the control information is recorded in any of the partial areas other than the partial area indicated by the position information, the apparatus recognizes that the control information was recorded by another apparatus. Accordingly, the apparatus judges that use of the content is not permitted, thereby preventing reuse of the content already used by the other apparatus and protecting the rights of a copyright holder of the content.

According to a third aspect of the present invention, the apparatus may have a structure in which the judgment unit judges that use of the content is permitted as an exception when the control information is recorded in the partial area indicated by the position information.

When the control information is recorded in the partial area indicated by the position information, the apparatus recognizes that the control information was recorded by the apparatus itself. Accordingly, the apparatus judges that use of the content is permitted. In this way, the rights of a user of an authorized apparatus to use the content are protected, even if the control information is recorded on the optical disc but installing processing has been interrupted due to a power cut or the like.

According to a fourth aspect of the present invention, the apparatus the judgment unit may judge that use of the content is permitted when the control information is not recorded in any of the partial areas, the apparatus may further comprise a writing unit configured to write the control information in the partial area indicated by the position information, when use of the content is judged to be permitted, and the usage control unit may use the content after the control information is written in the partial area indicated by the position information.

When the control information is not recorded within the control information area of the optical disc, the apparatus recognizes that the content recorded on the optical disc is to be used for the first time. Accordingly, the apparatus judges that use of the content is permitted, whereby the rights of a user of an authorized apparatus to use the content are protected. Furthermore, the apparatus writes the control information in the partial area corresponding thereto. In this way, even if installing processing has been interrupted due to a power cut or the like, the apparatus can determine itself to be authorized, by checking the control information area when the optical disc is remounted.

According to a fifth aspect of the present invention, the apparatus may further comprise: a content acquisition unit configured to acquire, from the optical disc, the content in a non-permission state where use of the content is not permitted; and a content storage unit configured to store the content in the non-permission state thus acquired, wherein after the control information is written in the partial area indicated by the position information, the usage control unit changes a state of the content stored in the content storage unit, from the non-permission state to a permission state where use of the content is permitted, and thereafter uses the content.

According to the stated structure, the apparatus permits the content to be used by the apparatus itself, after confirming that the control information is recorded on the optical disc so as to protect the content from use by other apparatuses. This prevents the content from being available for two or more apparatuses at the same time.

According to a sixth aspect of the present invention, the apparatus may have a structure in which the writing unit writes the control information by physically and irreversibly altering a layer on the optical disc.

According to the stated structure, the apparatus cannot tamper with the control information. This makes it possible to effectively protect the rights of a copyright holder of the content.

According to a seventh aspect of the present invention, the apparatus may have a structure in which the control information area is located within a lead-in area on the optical disc, and the writing unit writes the control information with use of a laser, into the partial area located in the lead-in area on the optical disc.

According to the stated structure, the apparatus writes the control information onto the optical disc, with use of an existing read-only laser. This eliminates the need of adding a new component to the apparatus.

According to an eighth aspect of the present invention, the apparatus may have a structure in which the optical disc is a ROM disc, the control information area is located in a burst cutting area within the lead-in area, and the writing unit writes the control information with use of burst cutting area technology, into the partial area located in the burst cutting area on the ROM disc.

According to the stated structure, the apparatus writes the control information onto the optical disc with use of a powerful laser, thus shortening time for writing the control information.

According to a ninth aspect of the present invention, the apparatus may further comprise: an identifier holding unit holding therein an apparatus identifier, which is a value unique to the apparatus; and a position information calculation unit configured to calculate the position information with use of the apparatus identifier, and record the position information thus calculated into the position information holding unit.

According to the stated structure, the position information is generated based on the value unique to the apparatus. This increases randomness of the position information.

According to a tenth aspect of the present invention, the apparatus may have a structure in which each partial area within the control information area is an area in which 1-bit information is recordable, and the control information written by the writing unit has a size of 1 bit.

According to the stated structure, each partial area is a small area in which 1-bit data is recordable. This increases randomness of the position information allocated to each individual apparatus. Also, the control information is 1-bit data. This shortens time for the apparatus to write the control information.

A ninth aspect of the present invention is an apparatus for using content recorded on an optical disc, wherein the optical disc includes a disc identifier area and a control information area, the disc identifier area being for holding a disc identifier specifying the optical disc, the control information area being composed of a plurality of partial areas, each being for recording control information indicating that use of the content is not permitted, the apparatus comprises: a disc identifier holding unit configured to hold therein an acquired disc identifier specifying an optical disc on which content, use of which is permitted, is recorded; a position information holding unit holding therein position information indicating one of the partial areas that is allocated for the apparatus to record the control information; an identifier reading unit configured to read the disc identifier from the disc identifier area of the optical disc; a first judgment unit configured to judge whether the control information is recorded in any of the partial areas other than the partial area indicated by the position information; a second judgment unit configured, when the first judgment unit judges negatively, to judge whether the control information is recorded in the partial area indicated by the position information; a third judgment unit configured, when the second judgment unit judges affirmatively, to judge whether the disc identifier read by the identifier reading unit is held in the disc identifier holding unit; and a usage control unit configured to use the content when the second judgment unit judges negatively and also the third judgment unit judges affirmatively.

According to the stated structure, when the control information is recorded in any of the partial areas other than the partial area indicated by the position information, the apparatus determines that the control information was recorded by another apparatus. Accordingly, the apparatus judges that use of the content is not permitted, thereby preventing use of the content already used by the other apparatus and protecting the rights of a copyright holder of the content.

Also, when the control information is not recorded within the control information area of the optical disc, the apparatus recognizes that the content recorded on the optical disc is to be used for the first time. Accordingly, the apparatus judges that use of the content is permitted, whereby the rights of a user of an authorized apparatus to use the content are protected.

Furthermore, when the control information is recorded in the partial area indicated by the position information, the apparatus further performs judgment regarding the disc identifier of the optical disc. When judging that the disc identifier of the optical disc is held in the apparatus, the apparatus determines that the control information was recorded by the apparatus itself. Accordingly, the apparatus judges that use of the content is permitted. In this way, the rights of a user of an authorized apparatus to use the content are protected, even when the control information is recorded on the optical disc but installing processing has been interrupted due to a power cut or the like.

Note that the apparatus according to the stated structure also has the following advantage. Suppose that the same position information is coincidentally allocated to multiple apparatuses. Even in such a case, the judgment using the disc identifier prevents use of the content by an unauthorized apparatus not having the disc identifier.

A twelfth aspect of the present invention may further comprise: a writing unit configured, when the second judgment unit judges negatively, to write the control information in the partial area indicated by the position information; and a disc identifier recording unit configured to write, as the acquired disc identifier, the disc identifier read by the reading unit into the disc identifier holding unit, wherein the usage control unit uses the content after the control information is written in the partial area indicated by the position information.

According to the stated structure, the apparatus writes the control information in the partial area corresponding thereto, and further records the disc identifier of the optical disc into the disc identifier holding unit. In this way, even if installing processing has been interrupted due to a power cut or the like, the apparatus can determine itself to be authorized, by checking the control information and the disc identifier when the optical disc is remounted.

A thirteenth aspect of the present invention may further comprise: a content acquisition unit configured to acquire, from the optical disc, the content in a non-permission state where use of the content is not permitted; and a content storage unit configured to store the content in the non-permission state thus acquired, wherein after the control information is written in the partial area indicated by the position information, the usage control unit changes a state of the content stored in the content storage unit, from the non-permission state to a permission state where use of the content is permitted, and thereafter uses the content.

According to the stated structure, the apparatus permits the content to be used by the apparatus itself, after confirming that the control information is recorded on the optical disc so as to protect the content from use by other apparatuses. This prevents the content from being available for two or more apparatuses at the same time.

According to a fourteenth aspect of the present invention, the apparatus may have a structure in which the writing unit writes the control information by physically and irreversibly altering a layer on the optical disc.

According to the stated structure, the apparatus cannot tamper with the control information. This makes it possible to effectively protect the rights of a copyright holder of the content.

According to a fifteenth aspect of the present invention, the apparatus may have a structure in which the control information area is located within a lead-in area on the optical disc, and the writing unit writes the control information with use of a laser, into the partial area located in the lead-in area on the optical disc.

According to the stated structure, the apparatus writes the control information onto the optical disc, with use of an existing read-only laser. This eliminates the need of adding a new component to the apparatus.

According to a sixteenth aspect of the present invention, the apparatus may have a structure in which the optical disc is a ROM disc, the control information area is located in a burst cutting area within the lead-in area, and the writing unit writes the control information with use of burst cutting area technology, into the partial area located in the burst cutting area on the ROM disc.

According to the stated structure, the apparatus writes the control information onto the optical disc with use of a powerful laser, thus shortening time for writing the control information.

A seventeenth aspect of the present invention may further comprise: an identifier holding unit holding therein an apparatus identifier, which is a value unique to the apparatus; and a position information calculation unit configured to calculate the position information with use of the apparatus identifier, and record the position information thus calculated into the position information holding unit.

According to the stated structure, the position information is generated based on the value unique to the apparatus, thus increasing randomness of the position information.

According to an eighteenth aspect of the present invention, the apparatus may have a structure in which each partial area within the control information area is an area in which 1-bit information is recordable, and the control information written by the writing unit has a size of 1 bit.

According to the stated structure, each partial area is a small area in which 1-bit data is recordable, thus increasing randomness of the position information allocated to each individual apparatus. Also, the control information is 1-bit data. This shortens time for the apparatus to write the control information.

The following describes Embodiments of the present invention with reference to the drawings.

(Embodiment 1)

FIG. 1 shows the structure of a content control system 1 according to Embodiment 1 of the present invention.

The content control system 1 includes an optical disc 10 and an apparatus 11. The optical disc 10 is a medium on which content is recorded. The apparatus 11 is an apparatus for using the content on the optical disc 10.

1. Structure of Optical Disc 10

First, an example of the structure of the optical disc 10 is described with reference to the drawings. In the present embodiment, a DVD-ROM (Digital Versatile Disc-Read Only Memory) is described as an example of the optical disc 10.

Figure 2:
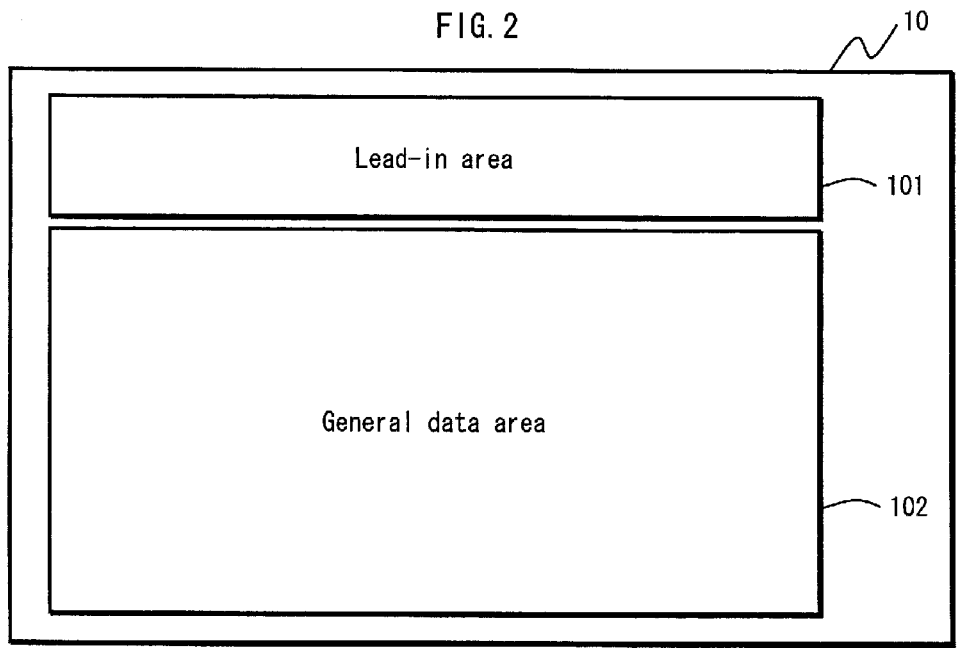
FIG. 2 shows a structure of a recording area of an optical disc 10 according to Embodiment 1 of the present invention.

FIG. 2 shows an example of the structure of a recording area of the optical disc 10 according to Embodiment 1 of the present invention. As shown in FIG. 2, the optical disc 10 includes a lead-in area 101 and a general data area 102.

(1) Lead-In Area 101

Figure 3:
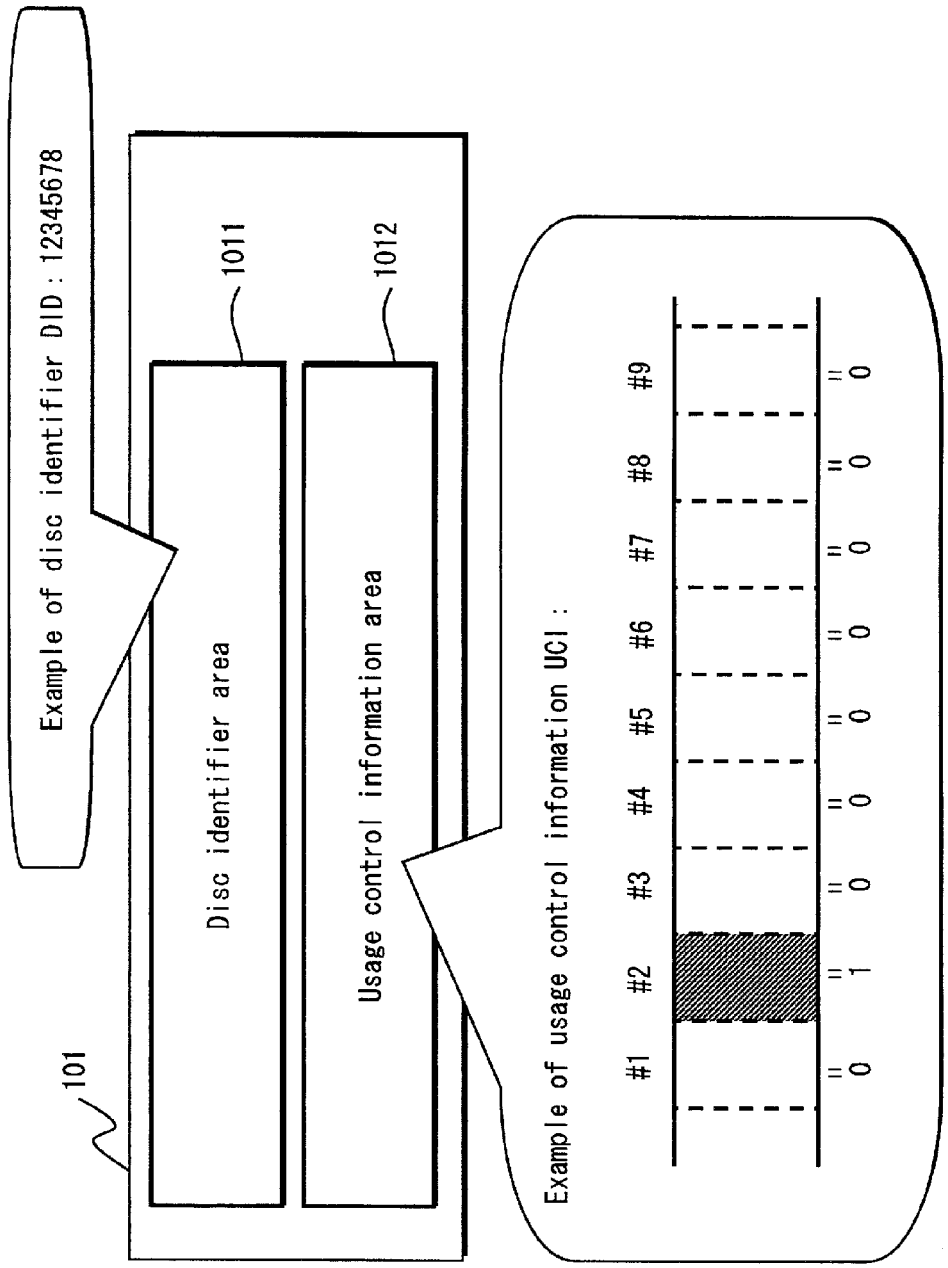
FIG. 3 shows a lead-in area 101 according to Embodiment 1 of the present invention.

FIG. 3 shows an example of the lead-in area 101 according to Embodiment 1. As shown in FIG. 3, the lead-in area 101 includes a disc identifier area 1011 and a usage control information area 1012.

The disc identifier area 1011 holds therein a disc identifier DID. The disc identifier DID is a number unique to the optical disc 10. The disc identifier DID is written onto the optical disc 10 at a factory during the manufacturing process. The disc identifier DID is written with use of BCA (Burst Cutting Area) technology, for example.

The usage control information area 1012 stores therein usage control information UCI. The usage control information UCI is information for controlling the use of content recorded on the optical disc 10. Specific examples of usage control include "enabling only a single apparatus to play back the content", "enabling only a single apparatus to copy the content into a memory", and the like. In other words, when the apparatus 11 performs an operation (e.g., playback, copy, install, etc.) pertaining to the content on the optical disc 10, the operation is controlled by the usage control information.

The usage control information area 1012 is composed of a plurality of areas of N bits (N being a natural number larger than or equal to two). Each area has the size of 1 bit and is associated with an area number (from #1 to #N). The initial state of each area is "0". It is permitted to record "1" only once as the value of each area. In the present embodiment, the value "1" is referred to as a usage completion signal. In the example of FIG. 3, the value "1" is recorded in an area corresponding to #2, and the other areas are in the initial state of "0". The usage completion signal is written by the apparatus 11 into the usage control information area 1012.

In the present embodiment, an example has been given of recording the usage control information UCI into the lead-in area 101. However, it is not limited to such. The usage control information UCI may be recorded in another area of the optical disc 10. For example, the usage control information UCI may be recorded in the general data area 102. In this case, it is possible to use a laser for optical discs to record data. Specifically, the laser may be used to physically and irreversibly alter a layer in the general data area 102.

(2) General Data Area 102

Figure 4:
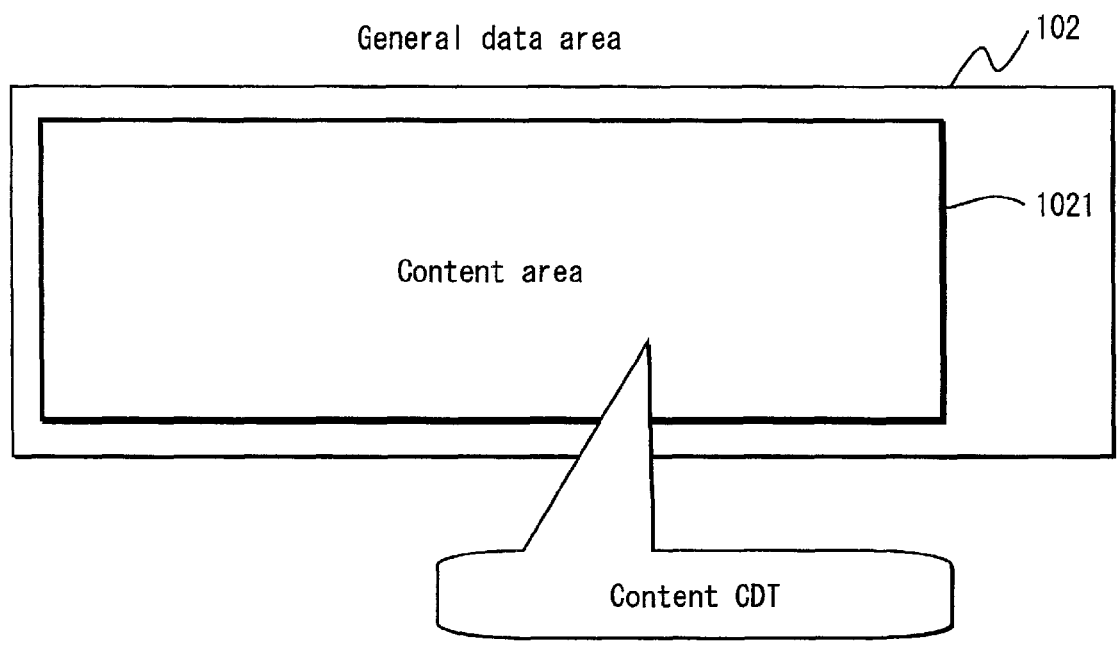
FIG. 4 shows a general data area 102 according to Embodiment 1 of the present invention.

FIG. 4 shows an example of the general data area 102 according to Embodiment 1. As shown in FIG. 4, the general data area 102 mainly includes a content area 1021. The content area 1021 stores therein content CDT. The content CDT is data used in the apparatus 11. Examples of the content CDT include still image data, text data, moving image data, game data, and a computer program.

2. Structure of Apparatus 11

Next, the structure of the apparatus 11 is described with reference to drawings.

Figure 5:
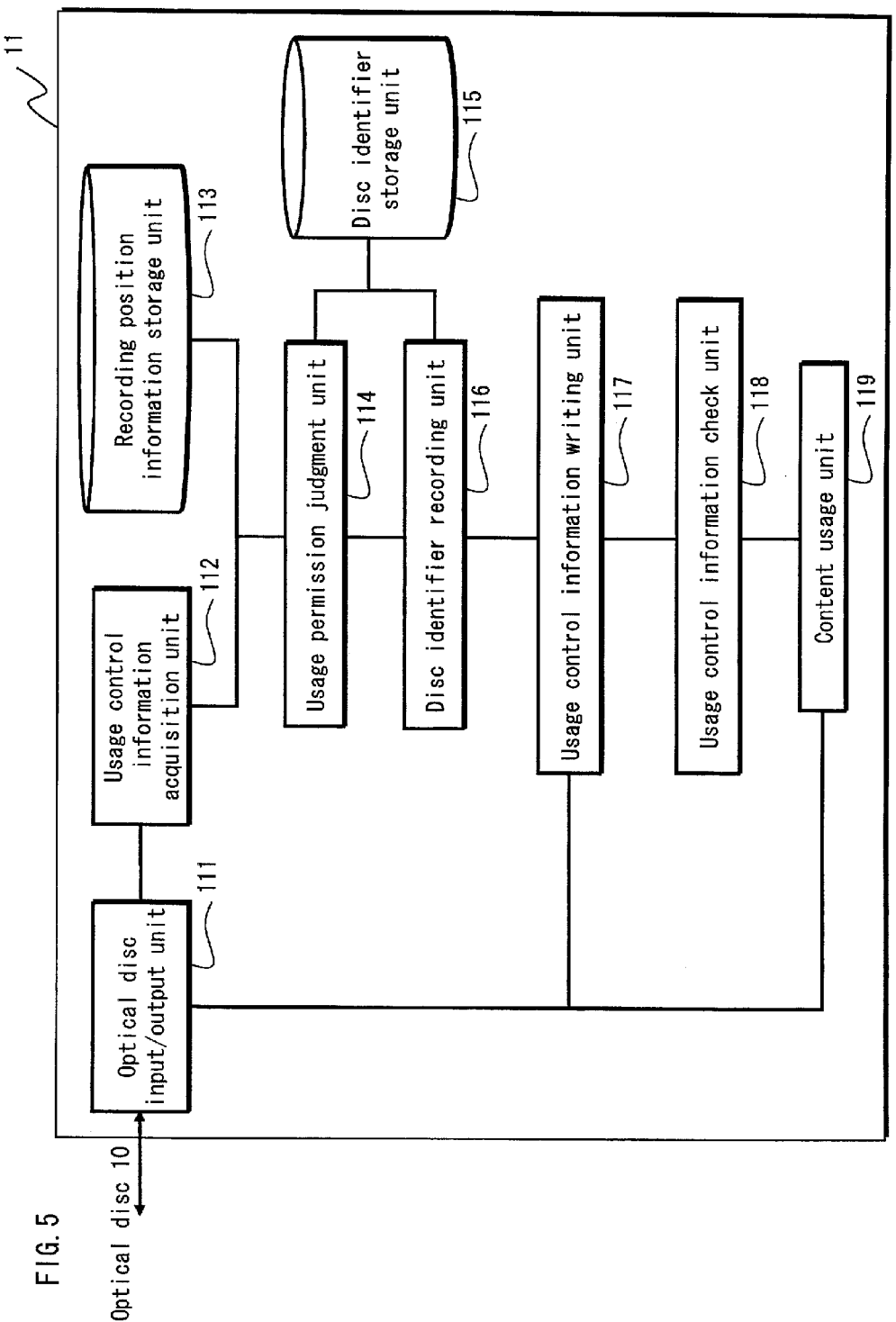
FIG. 5 shows a structure of an apparatus 11 according to Embodiment 1 of the present invention.

FIG. 5 shows an example of the apparatus 11 according to Embodiment 1 of the present invention. As shown in FIG. 5, the apparatus 11 includes: an optical disc input/output unit 111; a usage control information acquisition unit 112; a recording position information storage unit 113; a usage permission judgment unit 114; a disc identifier storage unit 115; a disc identifier recording unit 116; a usage control information writing unit 117; a usage control information check unit 118; and a content usage unit 119.

The following describes the components of the apparatus 11 with reference to the drawings.

(1) Optical Disc Input/Output Unit 111

The optical disc input/output unit 111 reads data recorded on the lead-in area 101 and the general data area 102 on the optical disc 10.

Furthermore, the optical disc input/output unit 111 records new data on the optical disc 10. Specifically, the optical disc input/output unit 111 records "1", namely "usage completion signal", into the usage control information area 1012 of the lead-in area 101 on the optical disc 10. Recording into the usage control information area 1012 may be performed with use of BCA (Burst Cutting Area) technology. However, it is not limited to such. Any technology can be employed as long as it uses a laser for optical discs to record data on an optical disc. For example, it is possible to employ a data recording method which uses a conventional laser for reading DVDs to physically alter a layer in the general data area on the optical disc 10.

(2) Usage Control Information Acquisition Unit 112

The usage control information acquisition unit 112 acquires the disc identifier DID and the usage control information UCI from the lead-in area 101 of the optical disc 10, via the optical disc input/output unit 111. The acquisition of the disc identifier DID and the usage control information UCI is performed when the optical disc 10 is inserted (mounted) in the apparatus 11, or when the usage control information acquisition unit 112 receives a usage instruction from a user in a state where the optical disc 10 has already been inserted (mounted) in the apparatus 11. The usage control information acquisition unit 112 outputs the disc identifier DID and usage control information UCI thus acquired to the usage permission judgment unit 114.

(3) Recording Position Information Storage Unit 113

Figure 6:
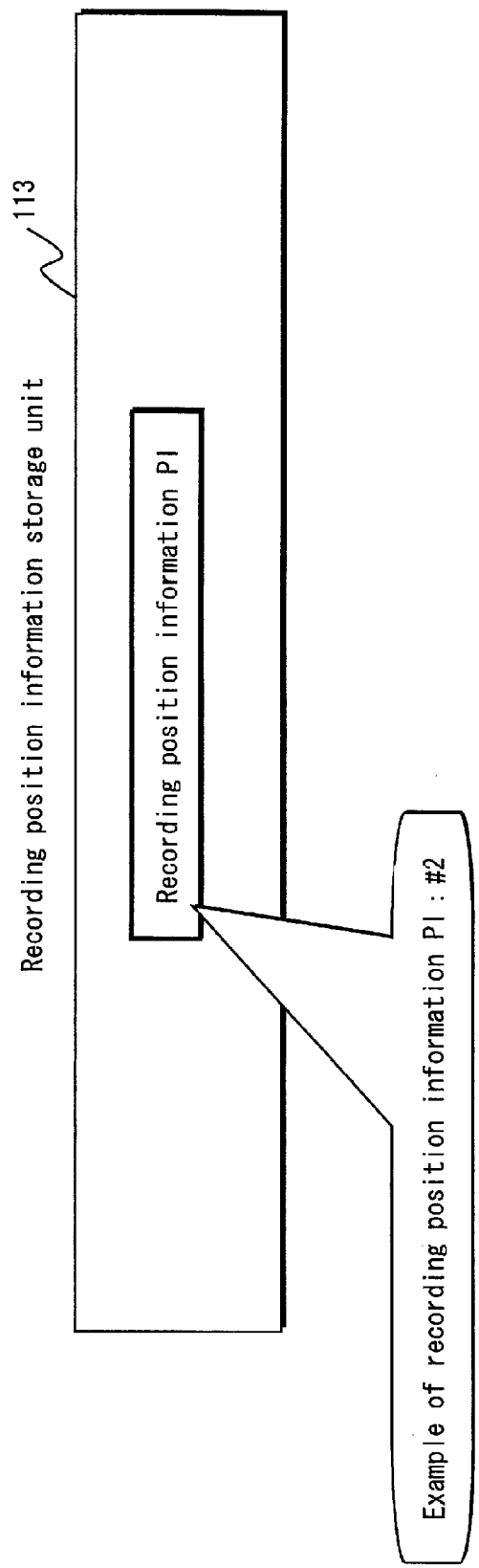
FIG. 6 shows a recording position information storage unit 113 according to Embodiment 1 of the present invention.

FIG. 6 shows the recording position information storage unit 113 according to Embodiment 1 of the present invention. As shown in FIG. 6, the recording position information storage unit 113 stores recording position information PI. The recording position information PI is information for specifying one of the plurality of areas (#1 to #N) included in the usage control information area 1012 of the lead-in area 101 of the optical disc 10. In the example of FIG. 6, "#2" is stored as the recording position information PI.

The recording position information PI is a value that is provided during the manufacturing process of the apparatus 11. For example, the recording position information PI is randomly generated based on a random number during the manufacturing process of the apparatus 11.

(4) Usage Permission Judgment Unit 114

The usage permission judgment unit 114 acquires the disc identifier DID and the usage control information UCI from the usage control information acquisition unit 112. Also, the usage permission judgment unit 114 acquires the recording position information PI from the recording position information storage unit 113.

First, the usage permission judgment unit 114 checks whether there is an area indicating "1 (i.e., usage completion signal)" among areas in the usage control information UCI, the areas being other than an area corresponding to the recording position information PI. If there is even a single area indicating "1 (i.e., usage completion signal)" among the areas other than the area corresponding to the recording position information PI, the usage permission judgment unit 114 judges that the content is not permitted to be used in the apparatus 11, and does not perform subsequent processing.

If none of the areas other than the area corresponding to the recording position information PI indicates "1 (i.e., usage completion signal)", the usage permission judgment unit 114 checks whether the area corresponding to the recording position information PI indicates "0" or "1 (i.e., usage completion signal)". If the area corresponding to the recording position information PI indicates "0", the usage permission judgment unit 114 judges that the content is permitted to be used in the apparatus 11, and outputs the recording position information PI and the disc identifier DID to the disc identifier recording unit 116.

If the area corresponding to the recording position information PI indicates "1 (i.e., usage completion signal)", the usage permission judgment unit 114 acquires a disc identifier DID2 stored in the disc identifier storage unit 115, and compares the value of the disc identifier DID2 to the value of the disc identifier DID acquired from the optical disc 10.

If the value of the disc identifier DID2 matches the value of the disc identifier DID, the usage permission judgment unit 114 judges that the content is permitted to be used in the apparatus 11, and outputs the recording position information PI and the disc identifier DID to the disc identifier recording unit 116. If the value of the disc identifier DID2 does not match the value of the disc identifier DID, the usage permission judgment unit 114 judges that the content is not permitted to be used in the apparatus 11, and does not perform subsequent processing.

(5) Disc Identifier Storage Unit 115

Figure 7:
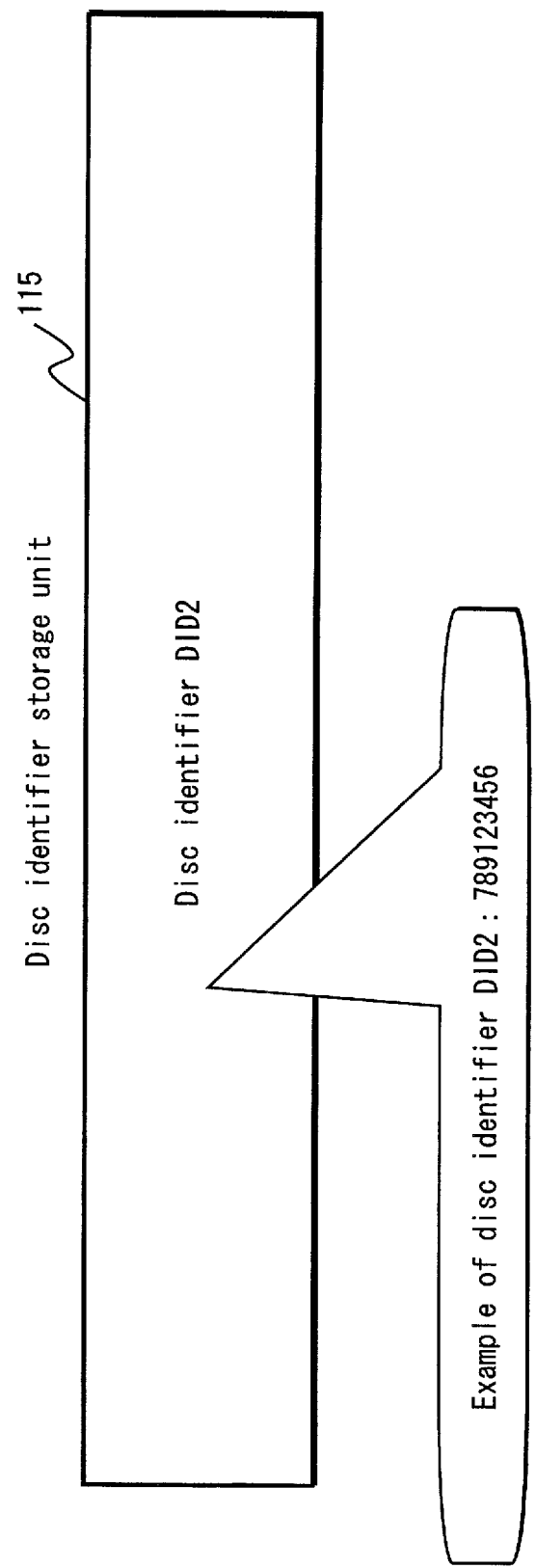
FIG. 7 shows a disc identifier storage unit 115 according to Embodiment 1 of the present invention.

FIG. 7 shows the disc identifier storage unit 115 according to Embodiment 1. The disc identifier storage unit 115 stores a disc identifier recorded by the disc identifier recording unit 116 that is described later. In the example shown in FIG. 7, the disc identifier storage unit 115 stores the disc identifier DID2.

(6) Disc Identifier Recording Unit 116

The disc identifier recording unit 116 acquires the recording position information PI and the disc identifier DID from the usage permission judgment unit 114. Then, the disc identifier recording unit 116 records the disc identifier DID into the disc identifier storage unit 115. Furthermore, the disc identifier recording unit 116 outputs the recording position information PI to the usage control information writing unit 117.

(7) Usage Control Information Writing Unit 117

The usage control information writing unit 117 acquires the recording position information PI from the disc identifier recording unit 116, and records "1 (i.e., usage completion signal)" into an area of the optical disc 10 via the optical disc input/output unit 111, the area corresponding to the recording position information PI and being located within the usage control information area 1012 of the lead-in area 101 of the optical disc 10. Subsequently, the usage control information writing unit 117 outputs the recording position information PI to the usage control information check unit 118.

(8) Usage Control Information Check Unit 118

Upon receiving the recording position information PI from the usage control information writing unit 117, the usage control information check unit 118 acquires the usage control information UCI from the usage control information area 1012 of the lead-in area 101 of the optical disc 10. Then, the usage control information check unit 118 checks whether "1 (i.e., usage completion signal)" is recorded in the area corresponding to the recording position information PI.

If "1 (i.e., usage completion signal)" is recorded in the corresponding area, the usage control information check unit 118 outputs a "permission signal" to the content usage unit 119. If "0" is indicated in the corresponding area, the usage control information check unit 118 outputs an "error signal", which indicates that the use of the content is not permitted, to the content usage unit 119.

(9) Content Usage Unit 119

If receiving the "permission signal" from the usage control information check unit 118, the content usage unit 119 acquires the content CDT on the optical disc 10 via the optical disc input/output unit 111, and uses the content CDT. If receiving the "error signal" from the usage control information check unit 118, the content usage unit 119 ends the processing without acquiring the content CDT.

3. Operation of Apparatus 11

The following describes an operation of the apparatus 11 with use of a flowchart.

Figure 8:
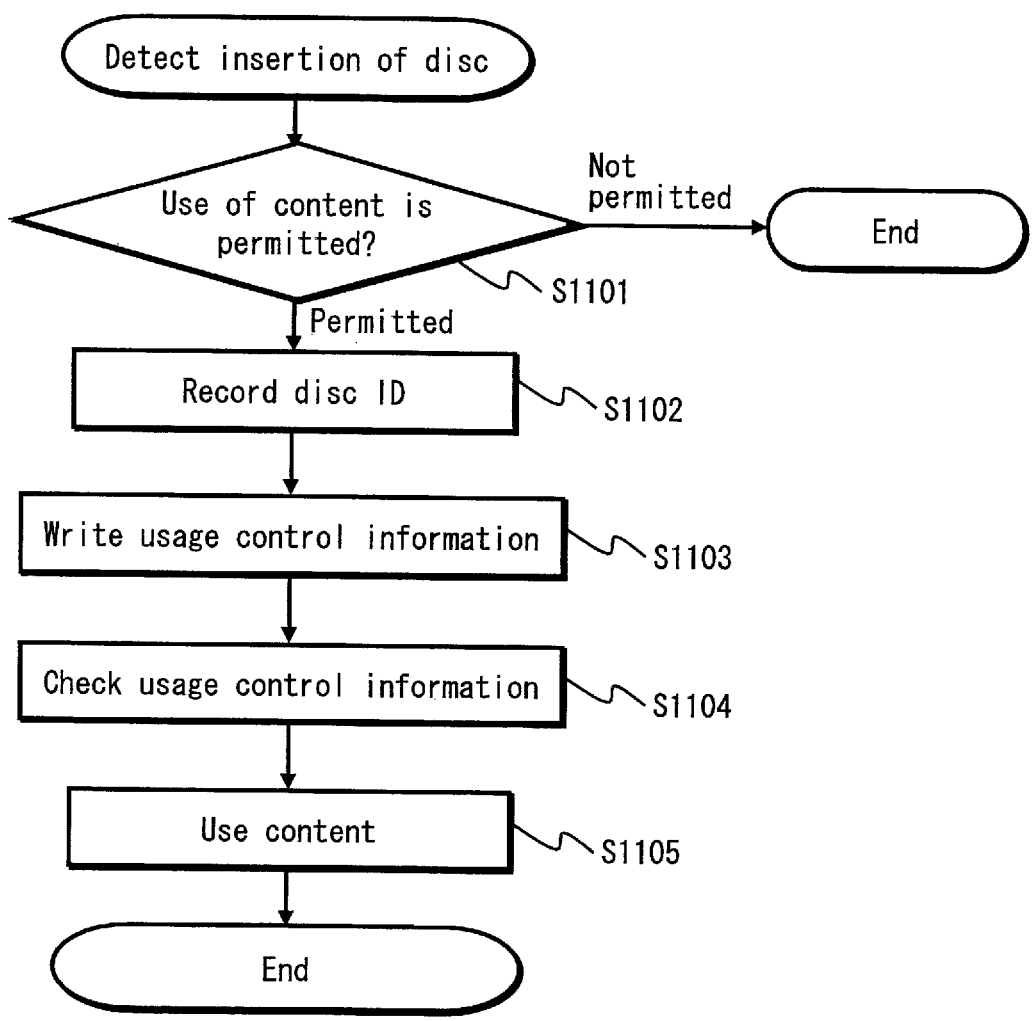
FIG. 8 shows a processing flow of the apparatus 11 according to Embodiment 1 of the present invention.

FIG. 8 shows an example of a processing flow of the apparatus 11 according to Embodiment 1 of the present invention. Here, a description is provided of an operation performed when the apparatus 11 uses the content CDT recorded on the optical disc 10, with reference to the flowchart of FIG. 8.

First, the apparatus 11 judges whether the use of the content CDT on the optical disc 10 is permitted (details of which are described later with reference to FIG. 9). If judging negatively, the apparatus 11 ends the processing. If judging affirmatively, the processing proceeds to step S1102 (step S1101).

The apparatus 11 records therein the disc identifier DID on the optical disc 10 (step S1102). The apparatus 11 writes the usage completion signal onto the optical disc 10 (step S1103).

The apparatus 11 checks whether the usage completion signal has been appropriately written on the optical disc 10. If judging affirmatively, the processing proceeds to step S1105. If judging negatively, the apparatus 11 ends the processing (step S1104).

Finally, the apparatus 11 uses the content CDT on the optical disc 10 (step S1105).

Figure 9:
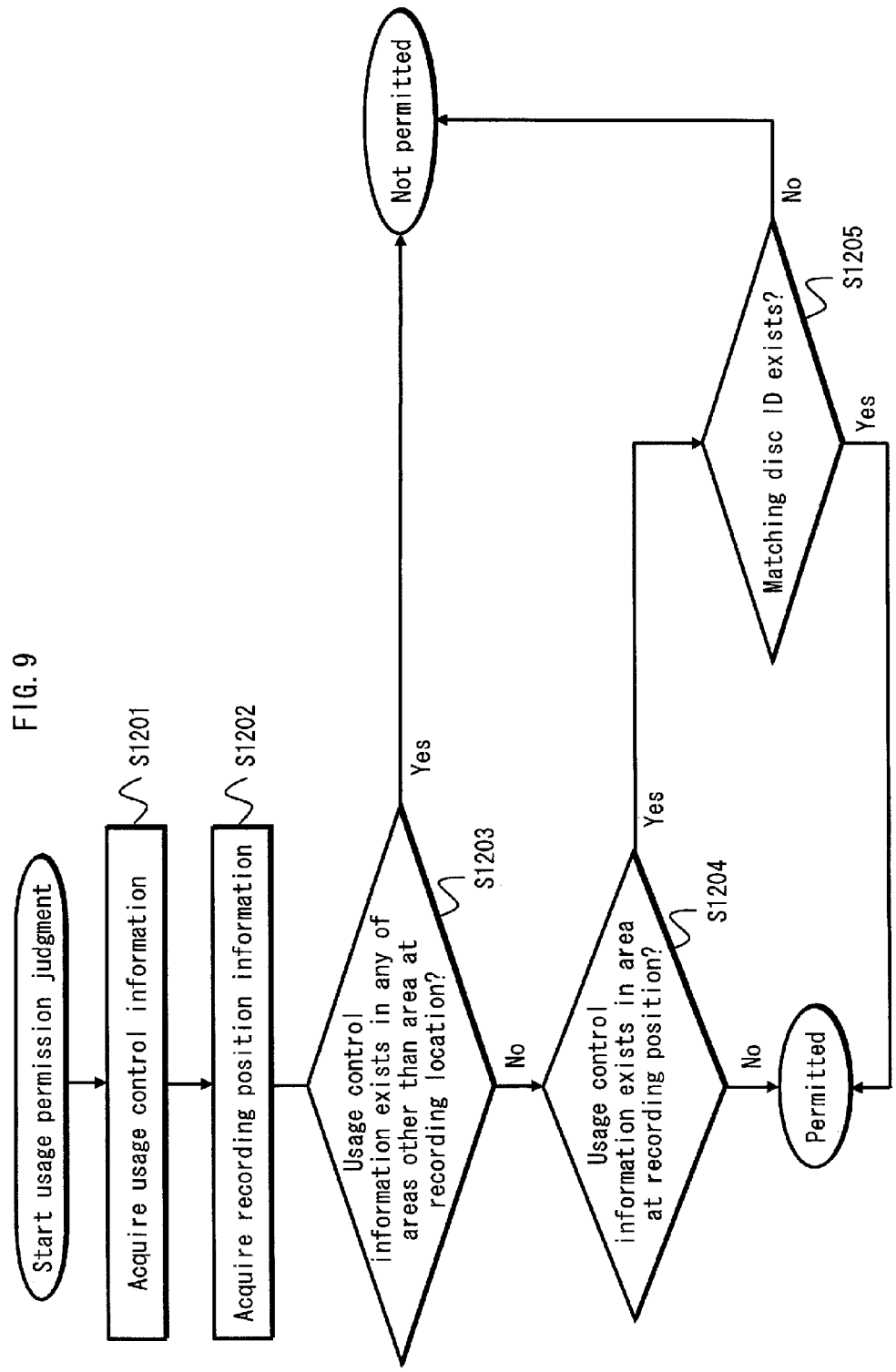
FIG. 9 shows a processing flow of usage permission judgment performed by the apparatus 11 according to Embodiment 1 of the present invention.

The following describes a processing flow (details of step S1101) of usage permission judgment in which the apparatus 11 judges whether the use of the content CDT is permitted, with reference to FIG. 9.

The usage permission judgment unit 114 acquires the usage control information UCI from the optical disc 10 (step S1201). The usage permission judgment unit 114 acquires the recording position information PI recorded inside the apparatus 11 (step S1202).

The usage permission judgment unit 114 checks whether the usage completion signal exists in any of the areas other than the area corresponding to the recording position information PI, based on the usage control information UCI (step S1203). If the usage completion signal exists in any of the areas, the usage permission judgment unit 114 judges that the use of the content CDT is not permitted. If the usage completion signal does not exist in any of the areas, the processing proceeds to step S1204.

The usage permission judgment unit 114 checks whether the usage completion signal exists in the area corresponding to the recording position information PI, based on the usage control information UCI (step S1204). If the usage completion signal exists in the area, the processing proceeds to step S1205. If the usage completion signal does not exist in the area, the usage permission judgment unit 114 judges that the use of the content CDT is permitted.

The usage permission judgment unit 114 checks whether the disc identifier DID acquired from the optical disc 10 matches the disc identifier DID2 recorded in the apparatus 11 (step S1205). If the disc identifier DID matches the disc identifier DID2, the usage permission judgment unit 114 judges that the use of the content CDT is permitted. If the disc identifier DID does not match the disc identifier DID2, the usage permission judgment unit 114 judges that the use of the content CDT is not permitted.

4. Effects of Embodiment 1

The following describes effects of Embodiment 1 with use of specific examples.

(1) Case 1

Case 1 describes a case where the optical disc 10 is new and is used in the apparatus 11 for the first time.

FIG. 10 shows an example of the operations of the apparatus 11 in case 1. As shown in the upper side of FIG. 10, the optical disc 10 that is new is in a state where the usage completion signal is not written in any of the areas in the usage control information area 1012 (i.e., all areas indicate "0"). When the optical disc 10 is used in the apparatus 11 which has "#2" as the recording position information PI, "1 (i.e., usage completion signal)" is written into an area corresponding to #2 on the optical disc 10. Subsequently, the apparatus 11 is permitted to use the content CDT.

Figure 11:
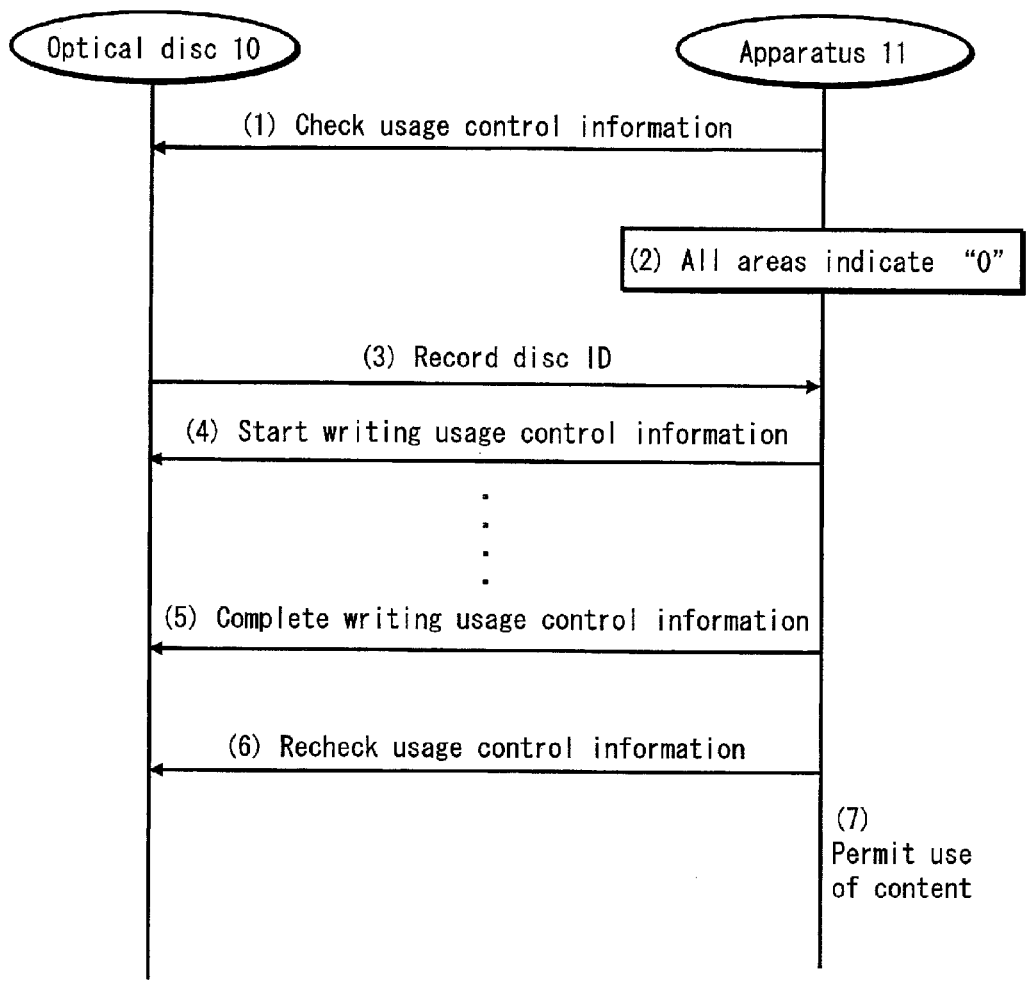
FIG. 11 shows a processing flow in a case where the optical disc 10 is new and is used in the apparatus 11 for the first time.

FIG. 11 shows a processing flow in the case where the optical disc 10 is new and is used in the apparatus 11 for the first time. First, the apparatus 11 checks the usage control information UCI on the optical disc 10. Since all areas in the usage control information area 1012 on the optical disc 10 indicate "0", the apparatus 11 judges that the content CDT on the optical disc 10 is permitted to be used, and records the disc identifier DID in the disc identifier storage unit 115. Then, the apparatus 11 writes "1 (i.e., usage completion signal)" in an area corresponding to the recording position information PI. Then, the apparatus 11 checks the usage control information UCI on the optical disc 10. If "1 (i.e., usage completion signal)" is recorded in the area corresponding to the recording position information PI, the apparatus 11 permits the use of the content CDT.

Figure 12:
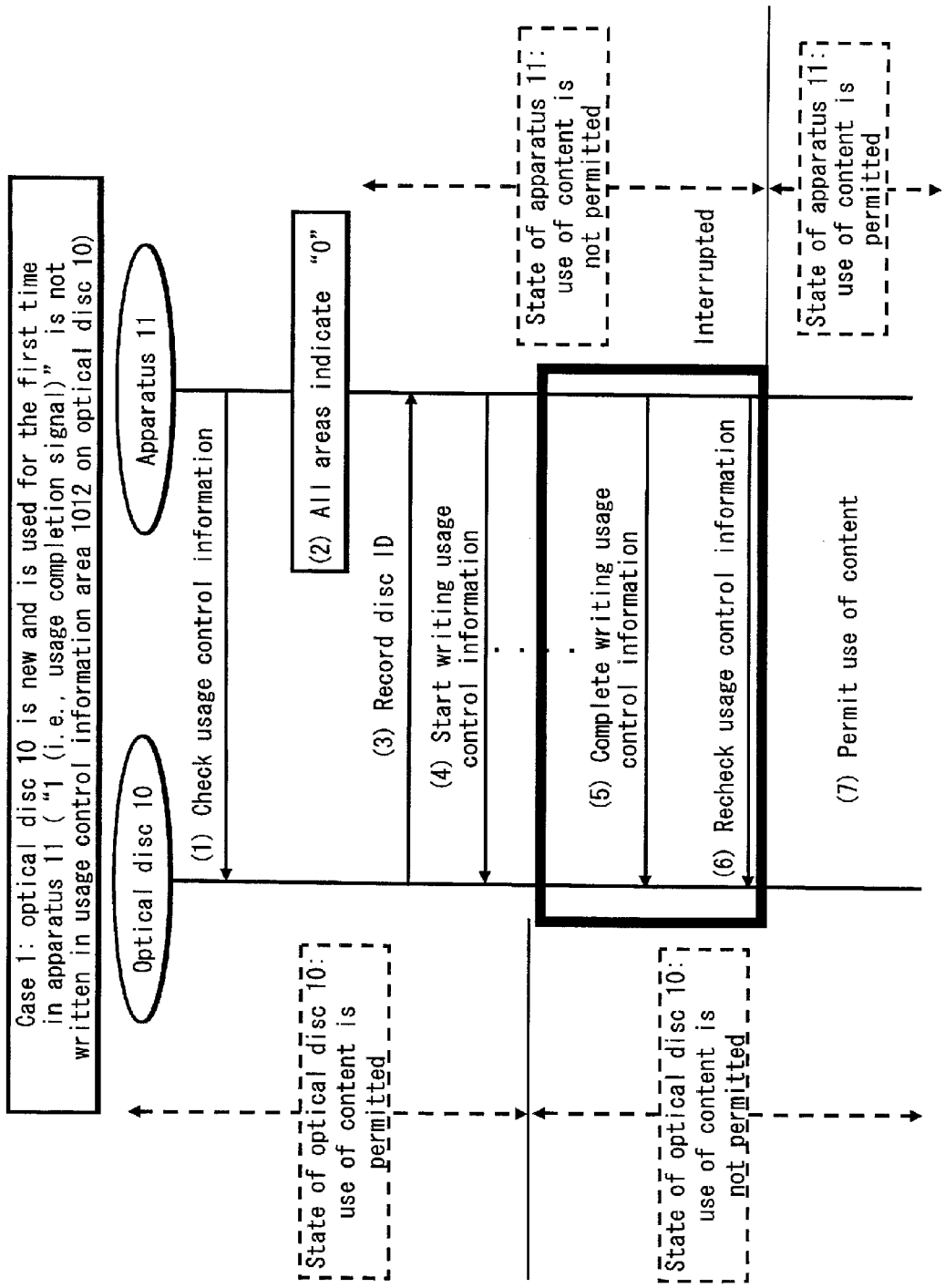
FIG. 12 shows a processing flow upon occurrence of abnormality, in a case where the optical disc 10 is new and is used in the apparatus 11 for the first time.

FIG. 12 shows a processing flow upon occurrence of abnormality, in a case where the optical disc 10 is new and is used in the apparatus 11 for the first time. Suppose that while the apparatus 11 is performing processing for writing the usage completion signal onto the optical disc 10, the processing is interrupted by a power failure or the like. In this case, "1 (i.e., usage completion signal)" may be written in an area on the optical disc 10, the area corresponding to the recording position information PI, as shown in FIG. 12.

The following describes an example of the operations of the apparatus 11 under such an abnormal condition, with use of case 2.

(2) Case 2

Case 2 describes a case where the optical disc 10 on which processing has been interrupted is used again in the apparatus 11.

Figure 13:
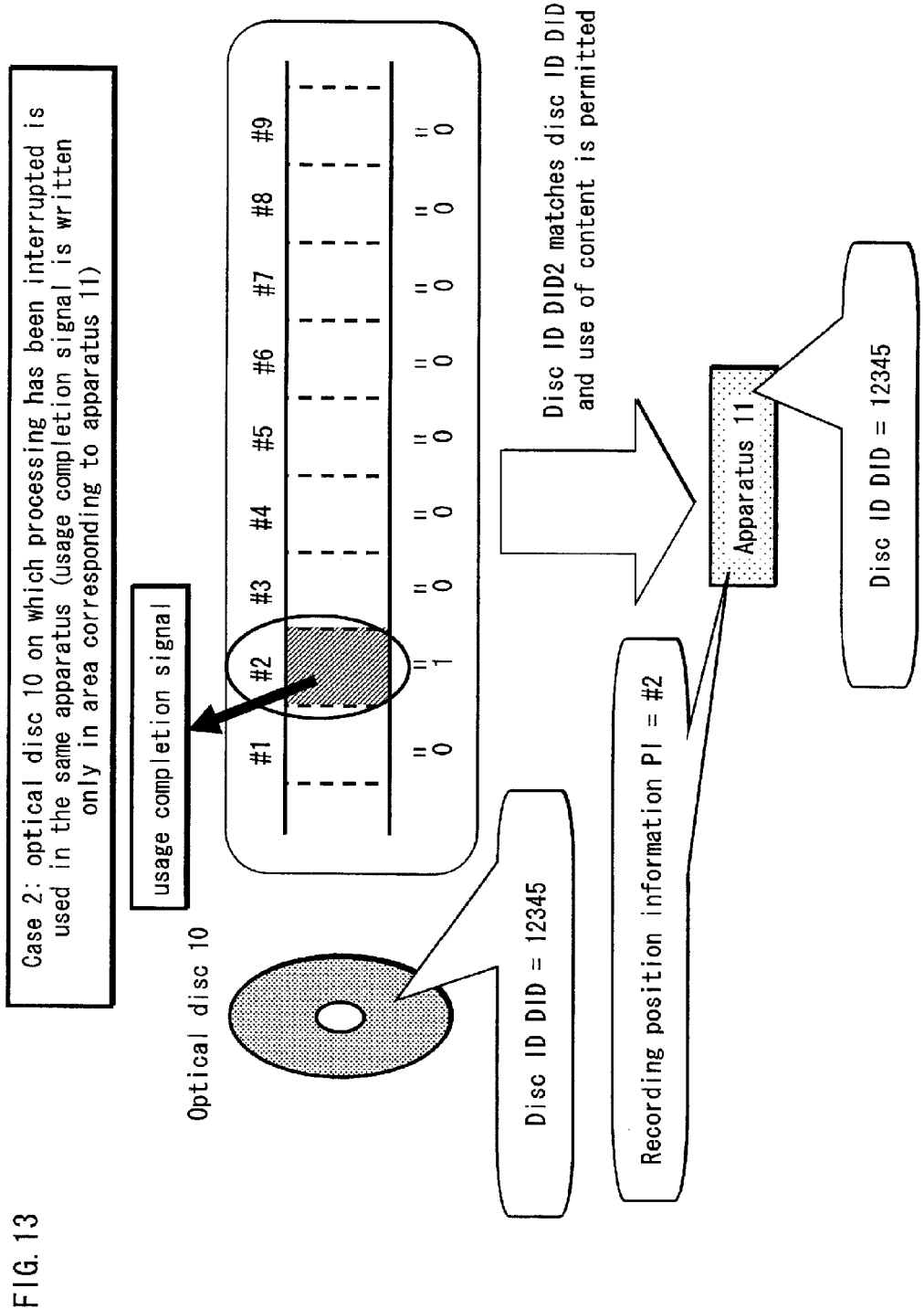
FIG. 13 shows an operation example, in a case where the optical disc 10 on which processing has been interrupted is used again in the same apparatus.

FIG. 13 shows an example of the operations of the apparatus 11 in case 2. In case 2, it is assumed that "1 (i.e., usage completion signal)" is already written in the area corresponding to #2 of the optical disc 10. In this case, the apparatus 11 compares the disc identifier DID2 recorded therein to the disc identifier DID acquired from the optical disc 10. If the disc identifier DID2 matches the disc identifier DID, the apparatus 11 judges that the processing was interrupted while the optical disc 10 was being used before, and permits the use of the content CDT on the optical disc 10. This enables the apparatus 11 to use the content CDT even if the processing was interrupted before, as long as it is the apparatus 11 that has written "1 (i.e., usage completion signal)" into the area corresponding to #2 on the optical disc 10.

Figure 14:
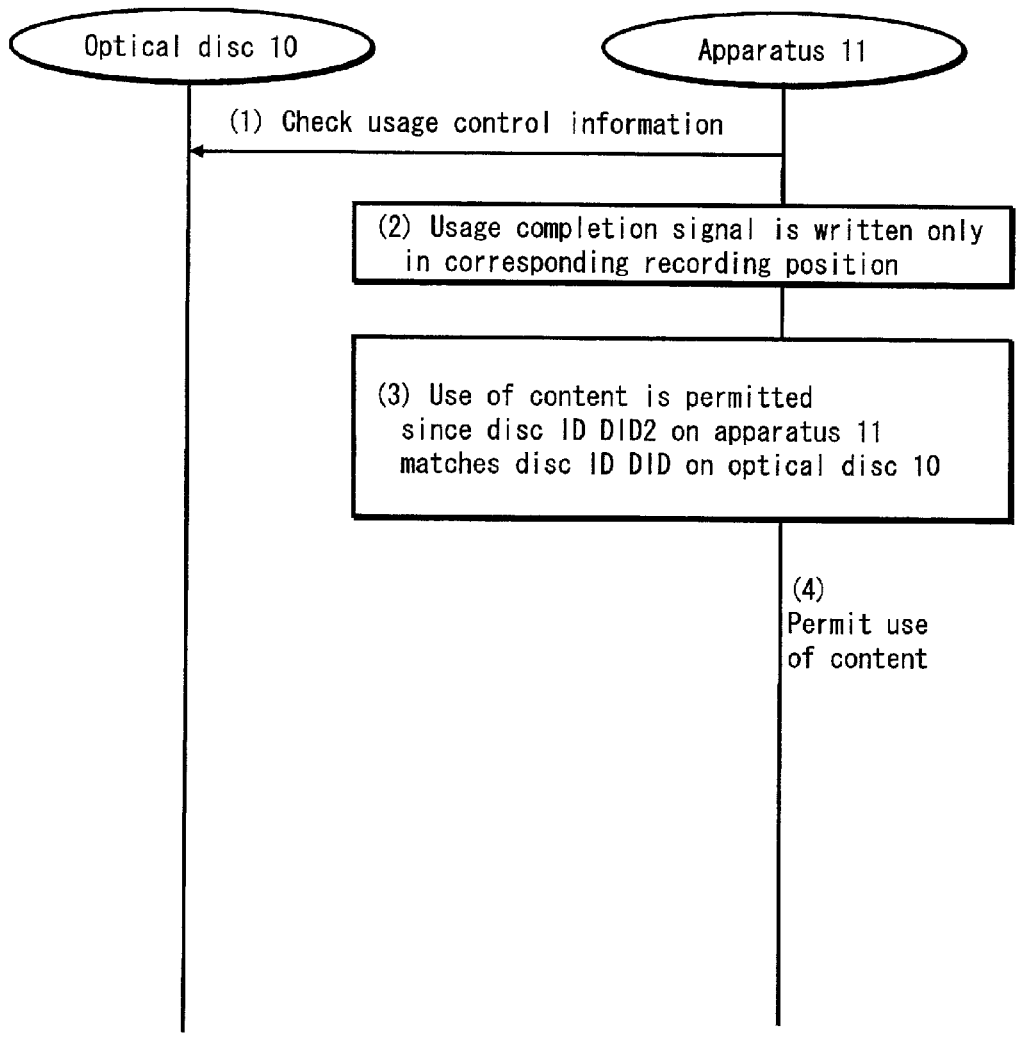
FIG. 14 shows a processing flow in a case where the optical disc 10 on which processing has been interrupted is used again in the same apparatus.

FIG. 14 shows a processing flow in the case where the optical disc 10 on which processing has been interrupted is reused in the same apparatus (i.e., apparatus 11 in the present embodiment). First, the apparatus 11 checks the usage control information UCI on the optical disc 10. Upon confirming that "1 (i.e., usage completion signal)" is written only in the area corresponding to the recording position information PI, the apparatus 11 further checks whether the disc identifier DID2 recorded on the apparatus 11 matches the disc identifier DID acquired from the optical disc 10. Upon confirming that the disc identifier DID2 matches the disc identifier DID, the apparatus 11 permits the use of the content CDT.

(3) Case 3

Case 3 describes a case where the apparatus 11 attempts to use the optical disc 10 which has been used by another apparatus.

Figure 15:
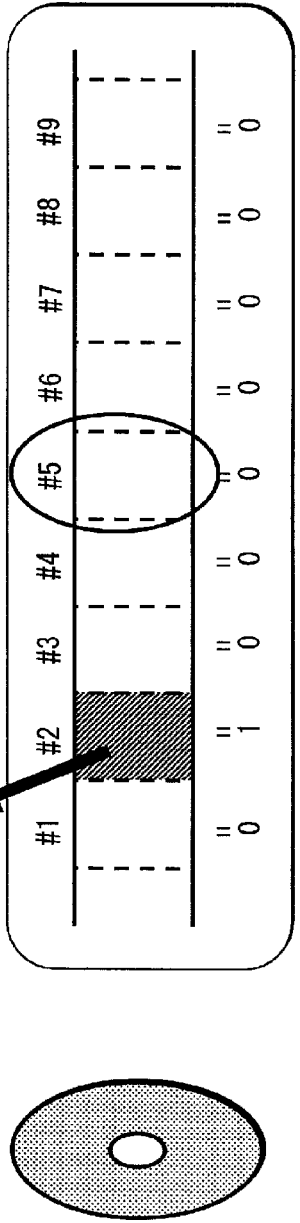
FIG. 15 shows an operation example in a case where the apparatus 11 attempts to use the optical disc 10 which has been used by another apparatus.

As shown in FIG. 15, the recording position information PI of the apparatus 11 is assumed to be "#5" in case 3. On the optical disc 10, the usage completion signal has already been written, by another apparatus, in the area "#2" which does not correspond to the recording position information PI of the apparatus 11. Accordingly, the apparatus 11 confirms that the usage completion signal is not written in the area corresponding to the recording position information PI. As a result, the apparatus 11 does not permit the use of the content CDT.

Figure 16:
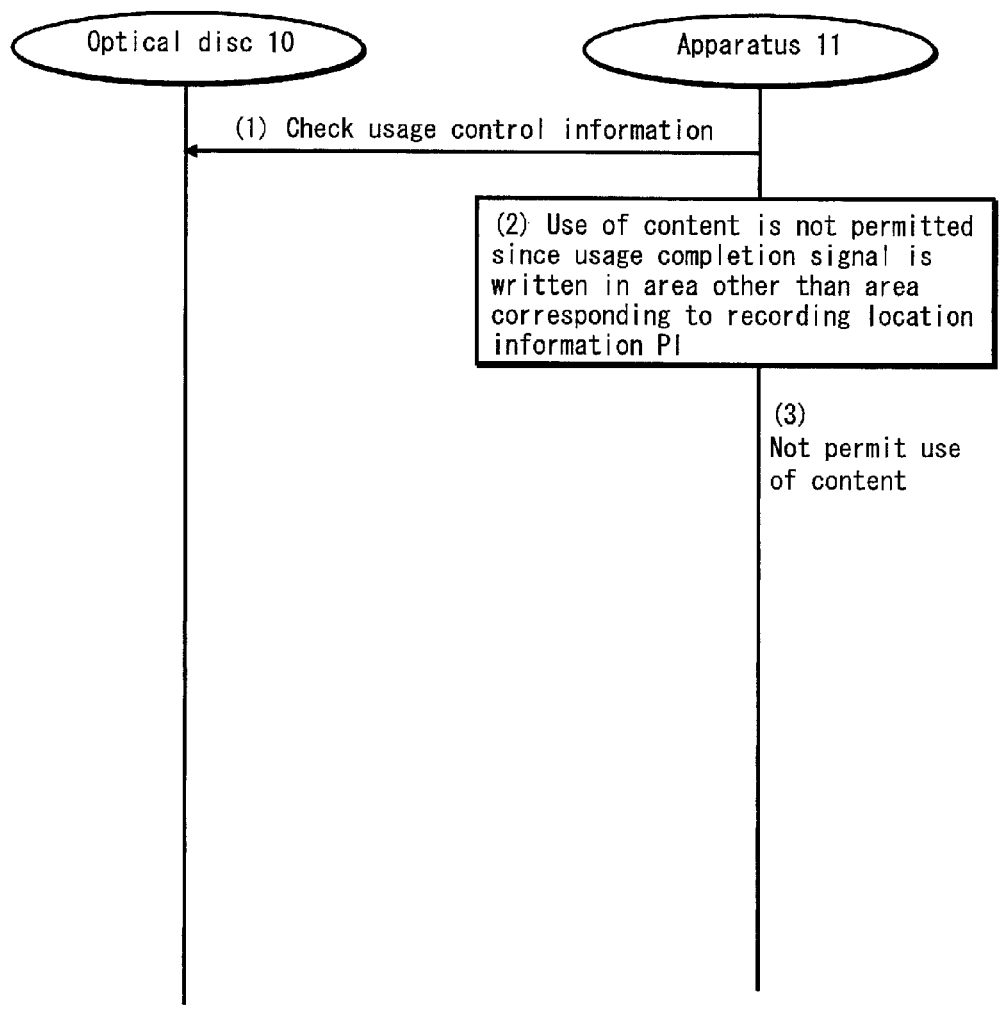
FIG. 16 shows a processing flow in a case where the apparatus 11 attempts to use the optical disc 10 which has been used by another apparatus.

FIG. 16 shows a processing flow of the apparatus 11 in case 3. First, the apparatus 11 checks the usage control information UCI on the optical disc 10. Upon confirming that "1 (i.e., usage completion signal)" is written in an area other than the area corresponding to the recording position information PI, the apparatus 11 does not permit the use of the content CDT.

(4) Case 4

Figure 17:
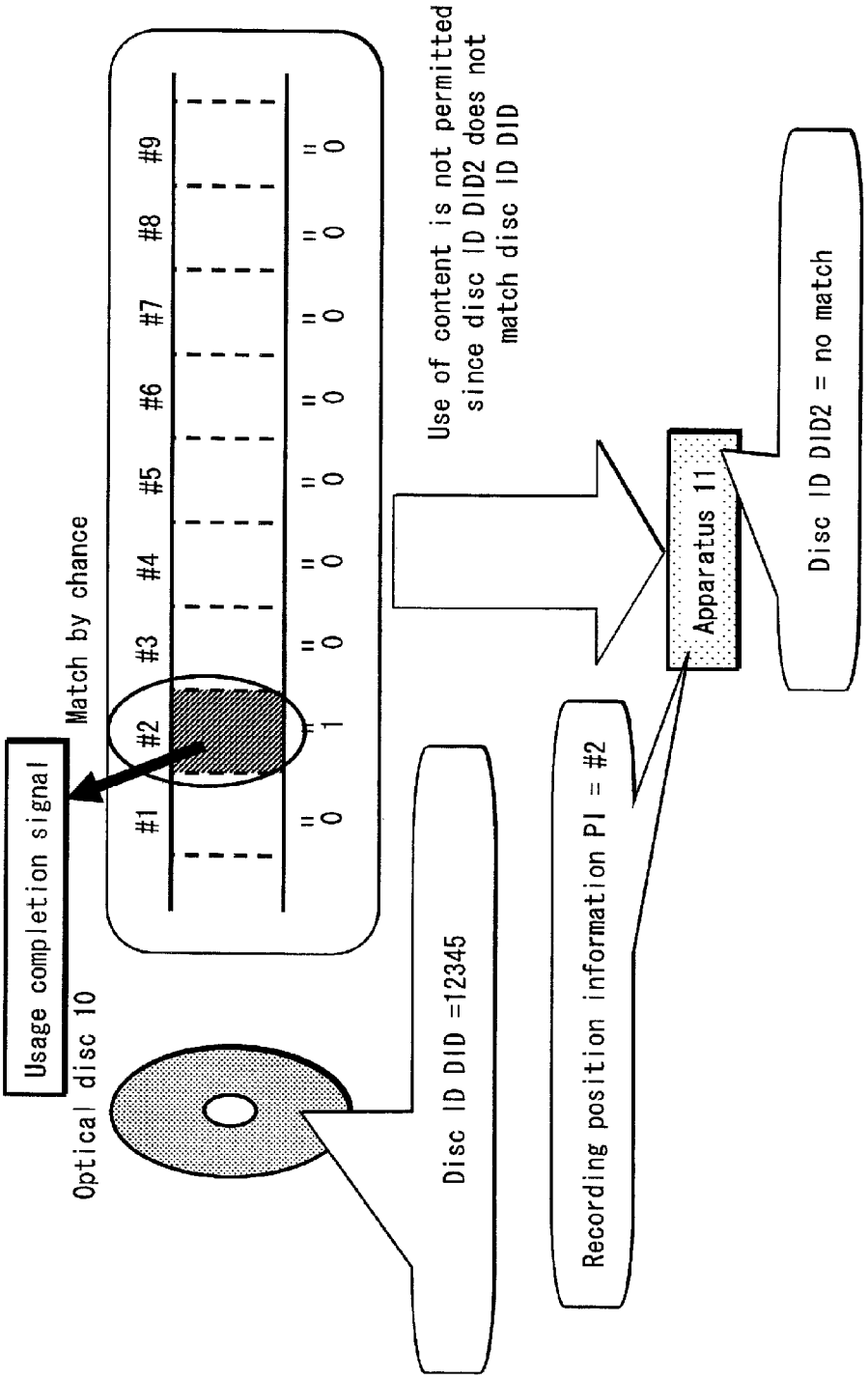
FIG. 17 shows another operation example in a case where the apparatus 11 attempts to use the optical disc 10 which has been used by another apparatus.

The following describes case 4 with reference to FIG. 17. Case 4 is similar to Case 3 in that it describes a case where the apparatus 11 attempts to use the optical disc 10 which has been used by another apparatus. However, in case 4, the value of the recording position information PI of the other apparatus happens to be the same as that of the apparatus 11.

In this case, the apparatus 11 confirms that the usage completion signal is written in the area corresponding to the recording position information PI. Subsequently, the apparatus 11 compares the disc identifier DID acquired from the optical disc 10 to the disc identifier DID2 recorded in the apparatus 11. Since the disc identifier DID does not match the disc identifier DID2, the apparatus 11 judges that the optical disc 10 has already been used by another apparatus, and that processing was not interrupted while the optical disc 10 was being used before. Accordingly, the apparatus 11 does not permit the use of the content CDT. This prevents unauthorized use of the content CDT.

Figure 18:
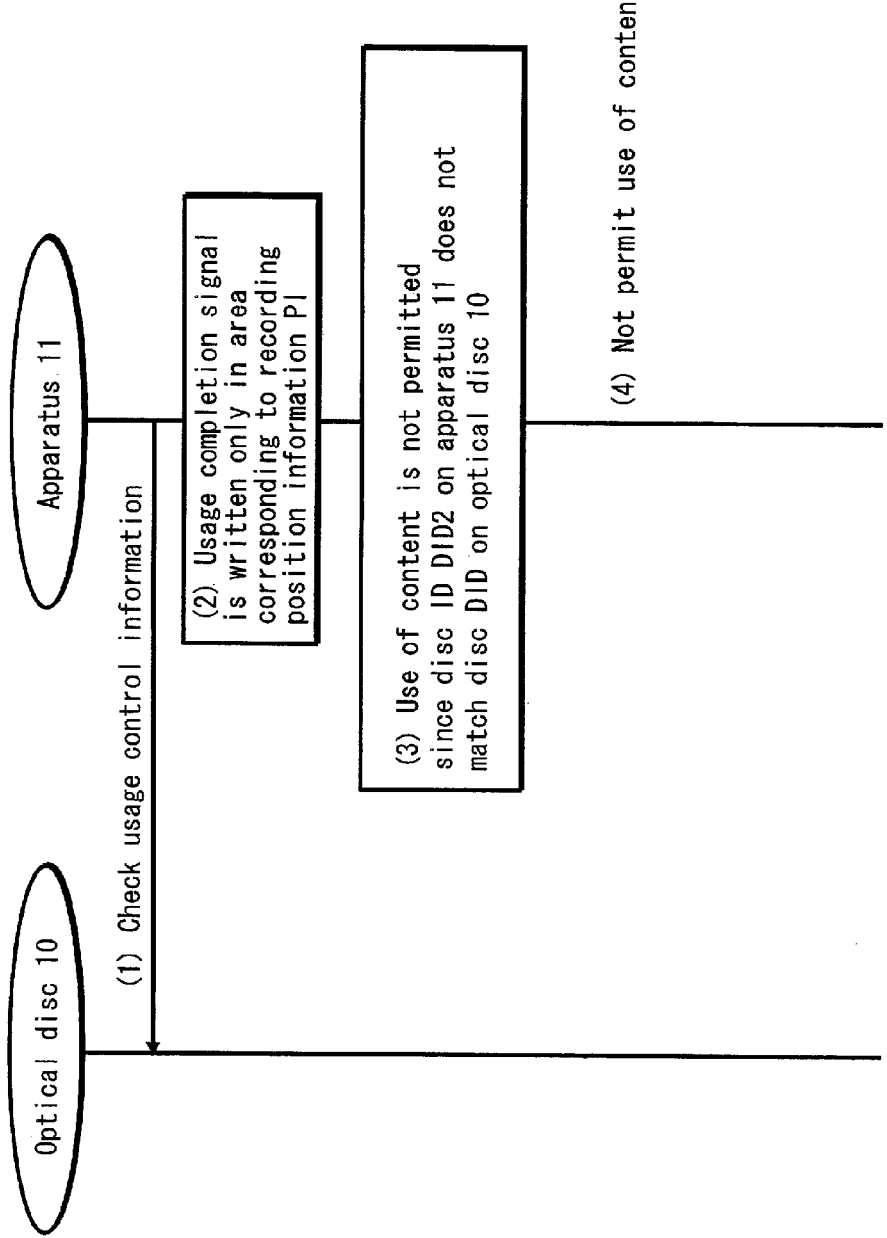
FIG. 18 shows a processing flow in a case where the apparatus 11 attempts to use the optical disc 10 which has been used by another apparatus.

FIG. 18 shows a processing flow of the apparatus 11 in case 4. First, the apparatus 11 checks the usage control information UCI on the optical disc 10. Then, the apparatus 11 confirms that "1 (i.e., usage completion signal)" is written only in an area corresponding to the recording position information PI. Subsequently, the apparatus 11 confirms that the disc identifier DID2 recorded therein does not match the disc identifier DID acquired from the optical disc 11. As a result, the apparatus 11 does not permit the use of the content CDT.

(5) Case 5

Figure 19:
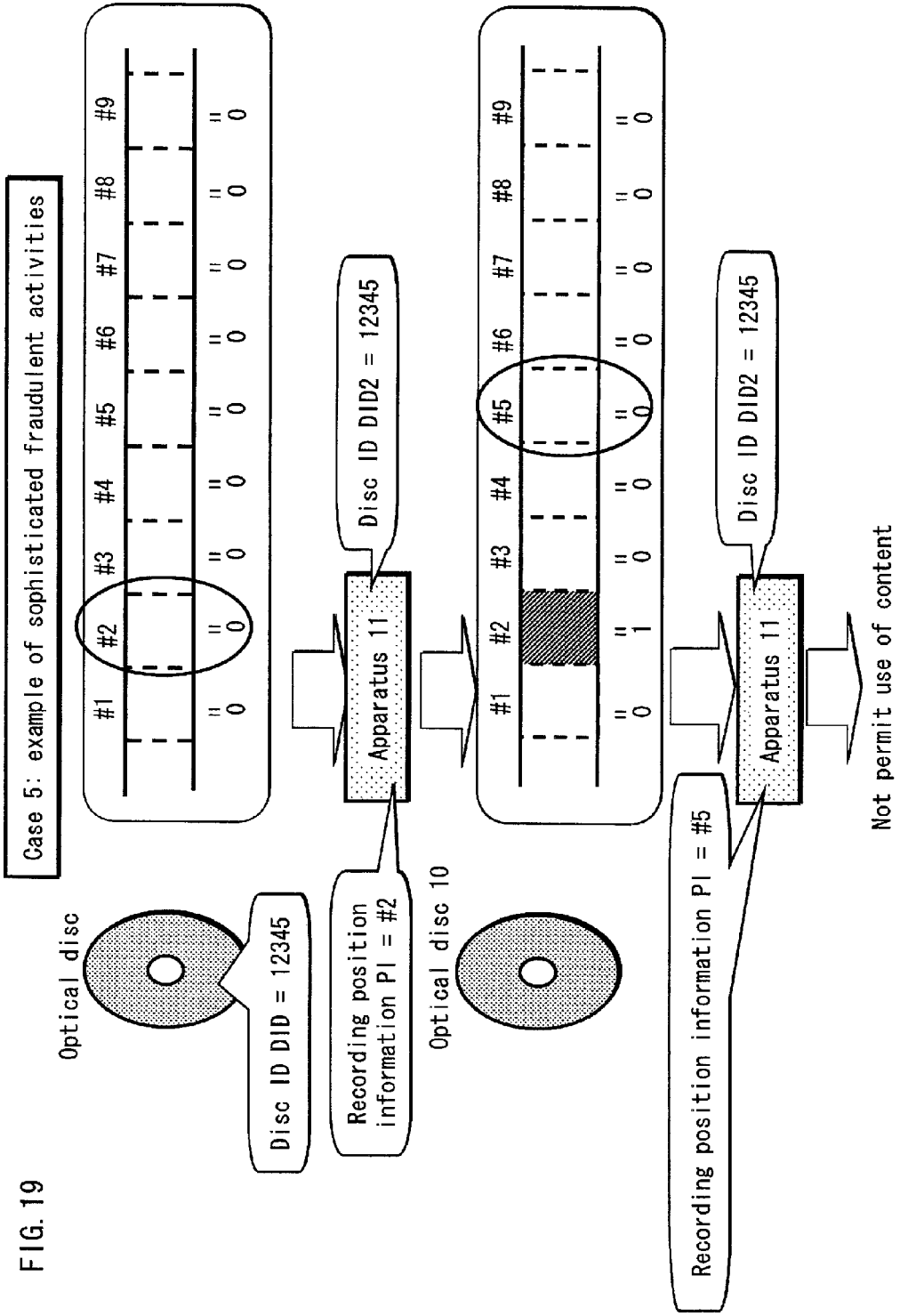
FIG. 19 is for explaining a sophisticated fraudulent activity.

Finally, case 5 is described with reference to FIG. 19. Case 5 describes an example of sophisticated fraudulent activities.

Specifically, in case 5, the optical disc 10 is ejected during the time period after the disc identifier of the optical disc 10 is recorded in an apparatus and before the usage completion signal is recorded in the optical disc 10. Further, the optical disc 10 is inserted in another apparatus, so that the disc identifier DID of the optical disc 10 is recorded in the other apparatus as well. This makes it look as if the processing had been interrupted in a plurality of apparatuses. This fraudulent activity is achieved by inserting the optical disc 10 in an apparatus, and turning off the power of the apparatus immediately after the disc identifier DID is recorded in the apparatus.

However, according to Embodiment 1, the fraudulent activity as described above is prevented as long as the recording position information PI stored in each apparatus (hereinafter, these apparatuses are referred to as "apparatuses 11") indicates a different value.

In order for a first one of the apparatuses 11 to use the content CDT, the usage completion signal needs to be recorded in an area corresponding to recording position information PI "#2". A second one of the apparatuses 11 checks whether the usage completion signal is recorded in an area other than an area corresponding to recording position information PI "#5". If the usage completion signal is recorded in an area other than the area corresponding to the recording position information PI "#5", the second one of the apparatuses 11 cannot use the content CDT. Similarly, third and subsequent ones of the apparatuses 11 cannot use the content CDT.

In this way, even if the plurality of apparatuses 11 store the same disc identifiers DID "12345", the value of the recording position information PI of each apparatus 11 is different, such as "#2" or "#5". This prevents unauthorized use of the content CDT.

5. Summary of Embodiment 1

The apparatus 11 according to Embodiment 1 as described above is summarized as follows.

The apparatus 11 is an apparatus for using content recorded on an optical disc, wherein the optical disc includes a disc identifier area and a control information area, the disc identifier area being for holding a disc identifier specifying the optical disc, the control information area being composed of a plurality of partial areas, each being for recording control information indicating that use of the content is not permitted, the apparatus comprises: a disc identifier holding unit configured to hold therein an acquired disc identifier specifying an optical disc on which content, use of which is permitted, is recorded; a position information holding unit holding therein position information indicating one of the partial areas that is allocated for the apparatus 11 to record the control information; an identifier reading unit configured to read the disc identifier from the disc identifier area of the optical disc; a first judgment unit configured to judge whether the control information is recorded in any of the partial areas other than the partial area indicated by the position information; a second judgment unit configured, when the first judgment unit judges negatively, to judge whether the control information is recorded in the partial area indicated by the position information; a third judgment unit configured, when the second judgment unit judges affirmatively, to judge whether the disc identifier read by the identifier reading unit is held in the disc identifier holding unit; and a usage control unit configured to use the content when the second judgment unit judges negatively and also the third judgment unit judges affirmatively.

Here, the disc identifier holding unit corresponds to the disc identifier storage unit 115 in FIG. 5. The position information holding unit corresponds to the recording position information storage unit 113 in FIG. 5. The identifier reading unit corresponds to the optical disc input/output unit 111 in FIG. 5. The first, second, and third judgment units correspond to the usage permission judgment unit 114 in FIG. 5. The usage control unit corresponds to the content usage unit 119 in FIG. 5.

Note that: the processing of the first judgment unit corresponds to step S1203 in FIG. 9; the processing of the second judgment unit corresponds to step S1204 in FIG. 9; and the processing of the third judgment unit corresponds to step S1205 in FIG. 9.

The apparatus 11 further comprises: a writing unit configured, when the second judgment unit judges negatively, to write the control information in the partial area that is indicated by the position information and is within the control information area; and a disc identifier recording unit configured to write, as the acquired disc identifier, the disc identifier read by the reading unit into the disc identifier holding unit, wherein the usage control unit uses the content after the control information is written in the partial area indicated by the position information.

Here, the writing unit corresponds to the usage control information writing unit 117 and the optical disc input/output unit 111 in FIG. 5. The disc identifier recording unit corresponds to the disc identifier recording unit 116 in FIG. 5. Also, checking as to whether the control information is written in the partial area indicated by the position information is performed by the usage control information check unit 118 in FIG. 5.

(Embodiment 2)

The following describes Embodiment 2 according to the present invention.

Figure 20:
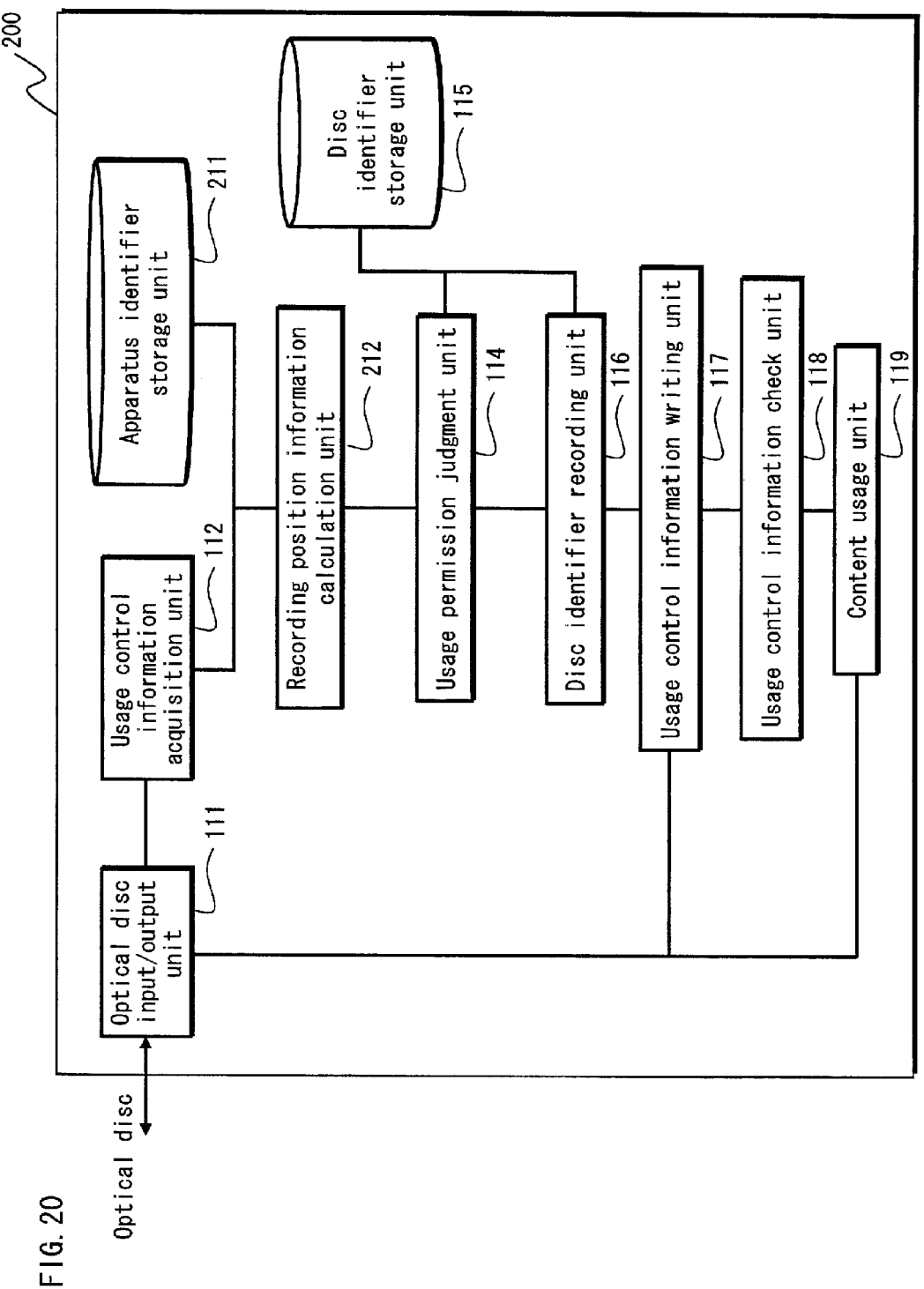
FIG. 20 shows a structure of an apparatus 200 according to Embodiment 2 of the present invention.

FIG. 20 shows an example of the structure of an apparatus 200 according to Embodiment 2 of the present invention. In FIG. 20, the same reference signs are given to components that are the same as the components of the apparatus 11 as shown in FIG. 5 according to Embodiment 1, and descriptions of such components are omitted.

According to Embodiment 1, the recording position information storage unit 113 of the apparatus 11 stores the recording position information PI in advance, and the apparatus 11 controls the use of the content on the optical disc with use of the recording position information PI. However, the present invention is not limited to such a structure.

The apparatus 200 according to Embodiment 2 includes an apparatus identifier storage unit 211 and a recording position information calculation unit 212, instead of the recording position information storage unit 113.

The apparatus identifier storage unit 211 holds an apparatus identifier ID for specifying the apparatus 200. The recording position information calculation unit 212 acquires the apparatus identifier ID from the apparatus identifier storage unit 211, and calculates the recording position information PI based on the apparatus identifier ID.

For example, the apparatus identifier ID is a 128-bit number. In the case where the recording position information PI comes in 10 patterns (i.e., from #0 to #9), the recording position information calculation unit 212 inputs the apparatus identifier ID into SHA-1 (Secure Hash Standard-1) algorithm, and thereby obtains an output value that is a hash value. The recording position information calculation unit 212 divides the output value by 10, and sets the reminder of the division as the recording position information PI of the apparatus 200.

As described above, the apparatus 200 according to Embodiment 2 acquires the recording position information PI by calculation based on the apparatus identifier ID that specifies the apparatus 200.

(Embodiment 3)

Figure 21:
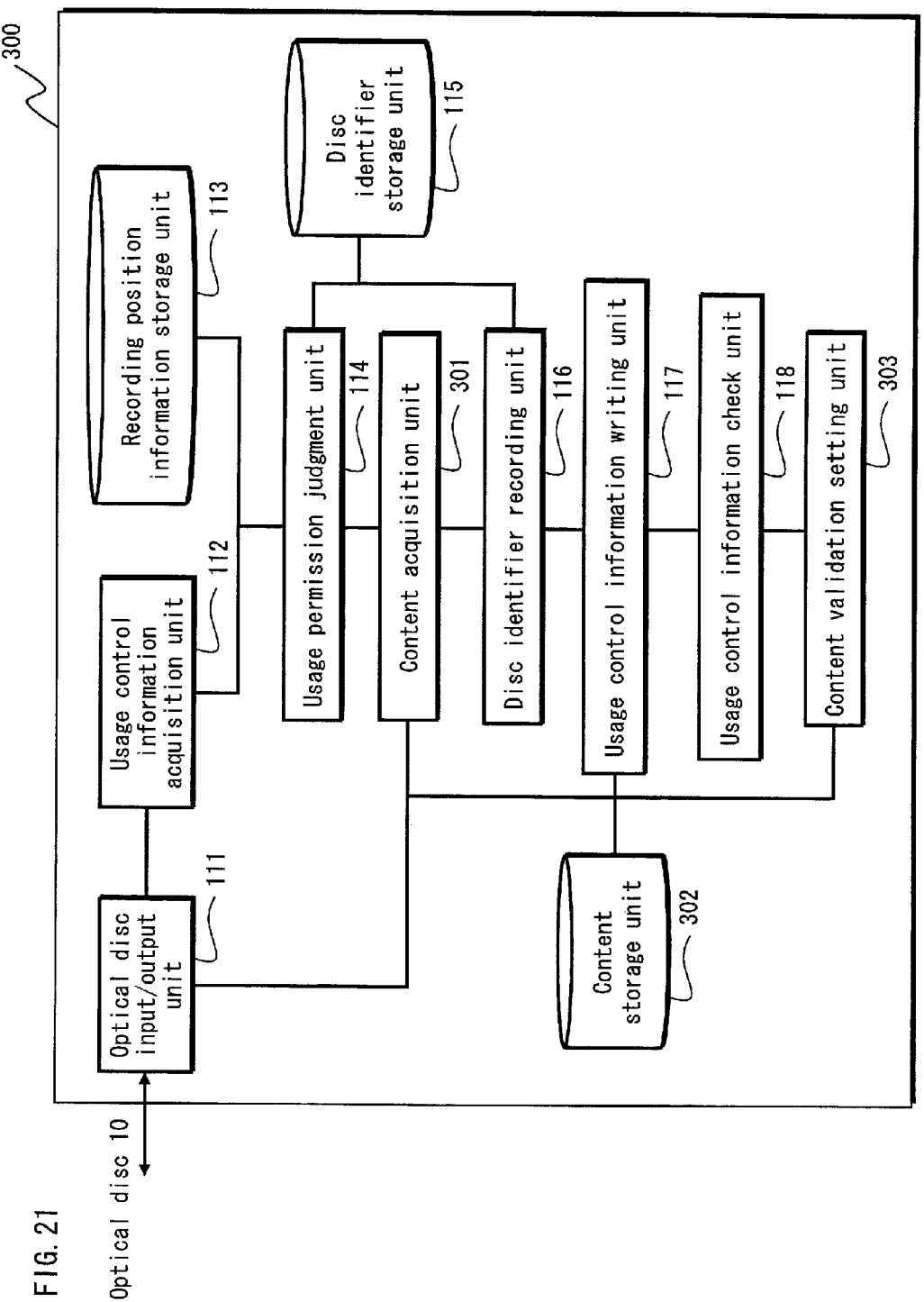
FIG. 21 shows a structure of an apparatus 300 according to Embodiment 3 of the present invention.

FIG. 21 shows an example of the structure of an apparatus 300 according to Embodiment 3 of the present invention. In FIG. 21, the same reference signs are given to components that are the same as the components of the apparatus 11 as shown in FIG. 5 according to Embodiment 1, and descriptions of such components are omitted.

According to Embodiment 1, the apparatus 11 uses the content on the optical disc 10 when the usage control information check unit 118 judges that the use of the content is "permitted". However, the present invention is not limited to such a structure.

The apparatus 300 according to Embodiment 3 includes a content acquisition unit 301, a content storage unit 302, and a content validation setting unit 303.

The content acquisition unit 301 acquires the content CDT from the optical disc 10 when the usage permission judgment unit 114 judges that the use of the content CDT is "permitted", and records the content CDT into the content storage unit 302. Upon acquiring the content CDT, the content acquisition unit 301 sets a usage permission flag UF corresponding to the content CDT to "not permitted".

The content storage unit 302 stores the content CDT acquired from the optical disc 10. Also, the content storage unit 302 stores therein the usage permission flag UF, which is used for controlling the use of the content CDT. When the usage permission flag UF indicates "permitted", the apparatus 300 is permitted to use the content CDT. When the usage permission flag UF indicates "not permitted", the apparatus 300 is not permitted to use the content CDT.

The content validation setting unit 303 sets the usage permission flag UF stored in the content storage unit 302 to "permitted", after the usage control information check unit 118 has confirmed that the usage completion signal was correctly written onto the optical disc 10.

In other words, according to Embodiment 3, the content CDT acquired from the optical disc 10 is not permitted for use at an early stage, and becomes available for use only after the checking processing by the usage control information check unit 118 is completed and the usage permission flag UF is set to "permitted". As described above, according to Embodiment 3, the usage permission flag is used to enhance security for content.

Note that the content CDT, which is acquired by the apparatus 300 from the optical disc 10, may be provided in advance with the usage permission flag UF with its state being set to "not permitted". In this way, the apparatus 300 acquires, from the optical disc 10, the content CDT which is in the state of not being permitted for use. This enhances security even during data transmission.

(Embodiment 4)

Figure 22:
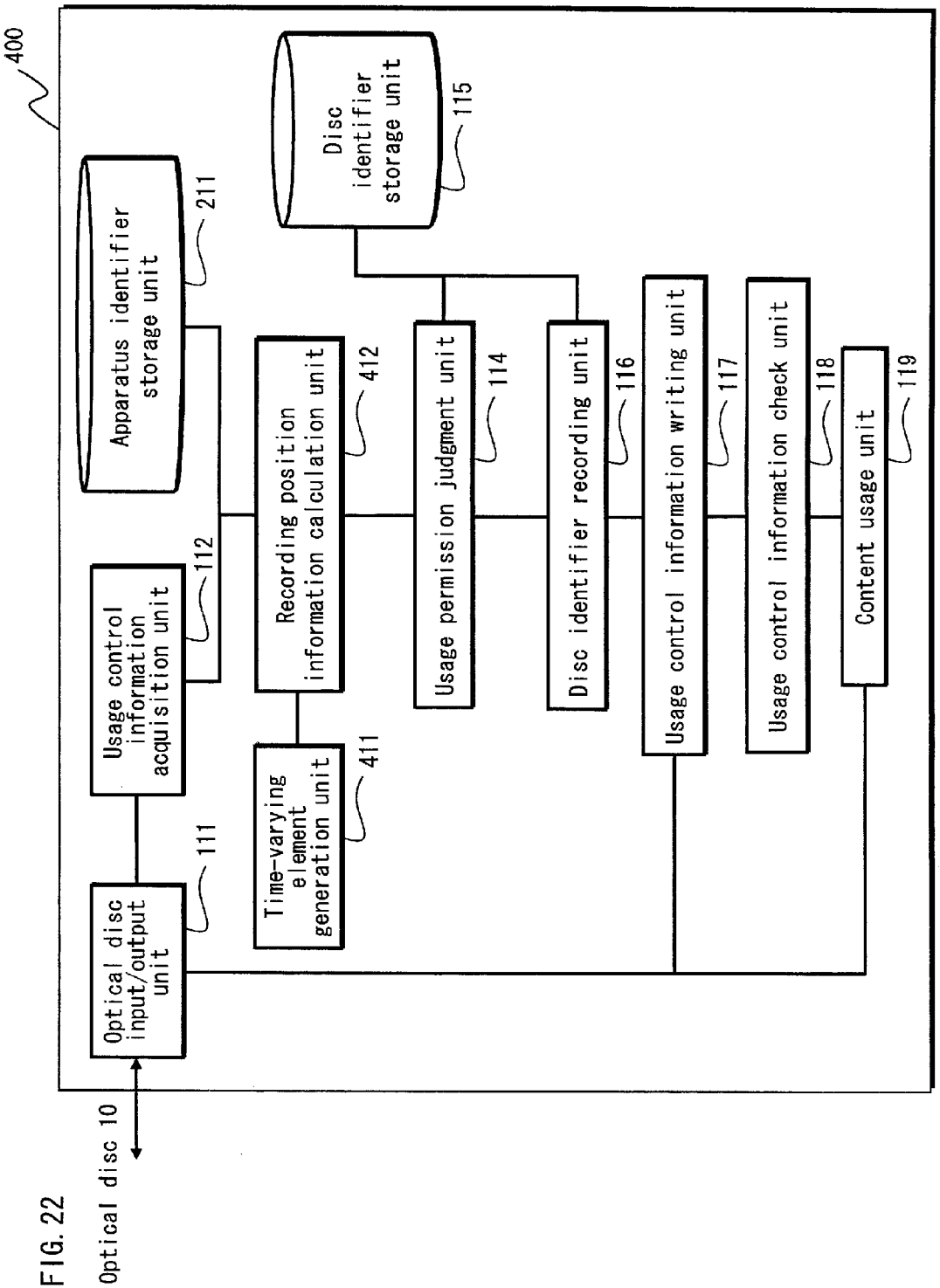
FIG. 22 shows a structure of an apparatus 400 according to Embodiment 4 of the present invention.

FIG. 22 shows an example of the structure of an apparatus 400 according to Embodiment 4 of the present invention. In FIG. 22, the same reference signs are given to components that are the same as the components of the apparatus 11 as shown in FIG. 5 according to Embodiment 1, and descriptions of such components are omitted.

In Embodiment 2 described above, the recording position information calculation unit 212 of the apparatus 200 calculates the recording position information PI, based on the apparatus identifier ID. However, the present invention is not limited to such.

The apparatus 400 includes the apparatus identifier storage unit 211, a time-varying element generation unit 411, and a recording position information calculation unit 412.

The time-varying element generation unit 411 includes a timer, for example, and outputs a value that varies depending on time. The recording position information calculation unit 412 calculates the recording position information PI, with use of the apparatus identifier ID and the value output from the time-varying element generation unit 411.

Examples of such values that vary depending on time include: calendar months (from January to December); calendar dates (from $1^{st}$ to $3^{st}$); hours (0 hour to 23 hour); minutes (0 minutes to 59 minutes); or a combination of these values.

As described above, the structure according to Embodiment 4 prevents the coincidental match between a value indicated by the recording position information PI of an apparatus and a value indicated by the recording position information PI of another apparatus. This further enhances security in using the content CDT.

(Embodiment 5)

Figure 23:
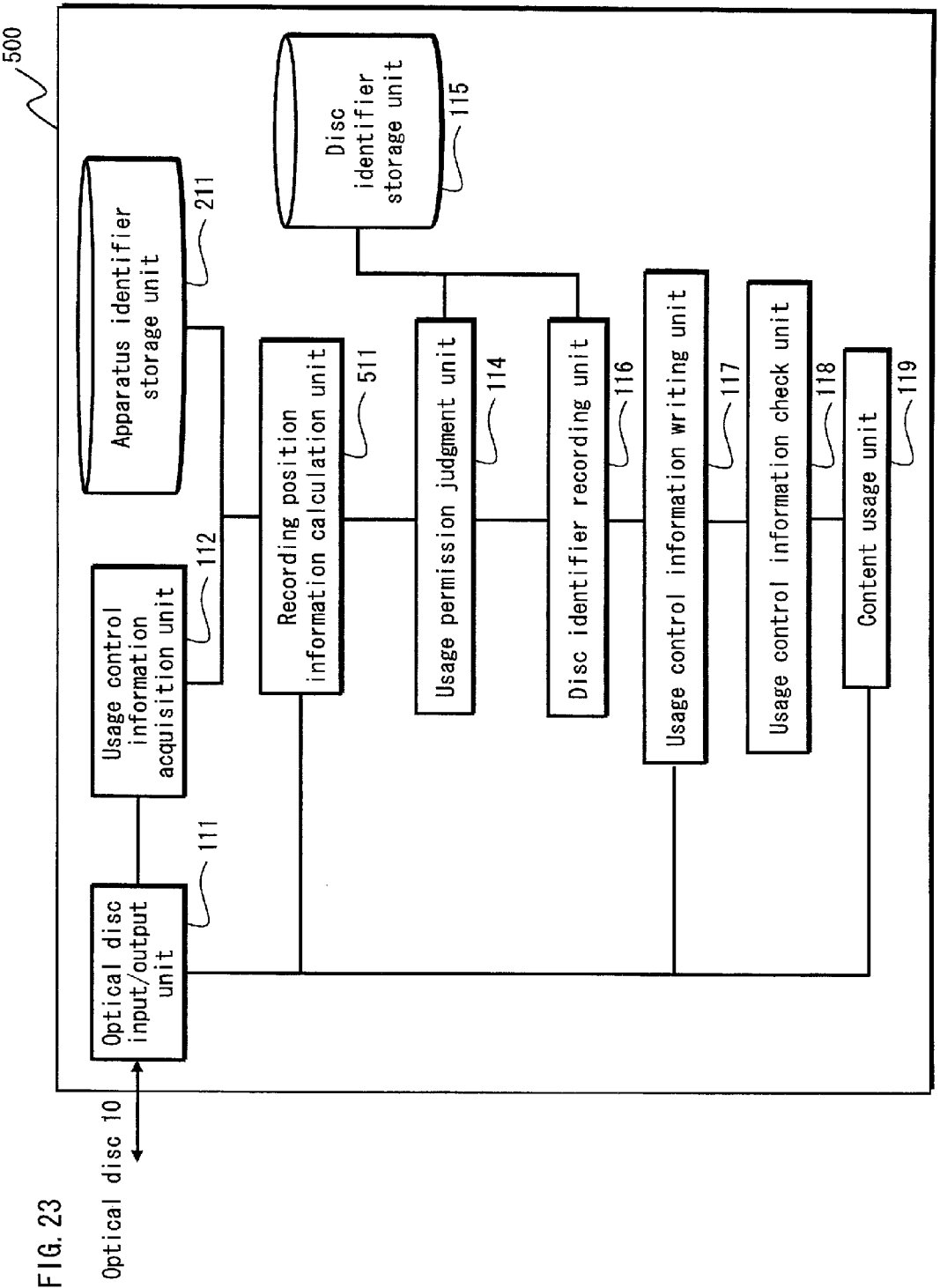
FIG. 23 shows a structure of an apparatus 500 according to Embodiment 5 of the present invention.

FIG. 23 shows an example of the structure of an apparatus 500 according to Embodiment 5 of the present invention. In FIG. 23, the same reference signs are given to components that are the same as the components of the apparatus 11 as shown in FIG. 5 according to Embodiment 1, and descriptions of such components are omitted.

In Embodiment 2 described above, the recording position information calculation unit 212 of the apparatus 200 calculates the recording position information PI, based on the apparatus identifier ID. However, the present invention is not limited to such.

The apparatus 500 according to Embodiment 5 includes the apparatus identifier storage unit 211, and a recording position information calculation unit 511.

The recording position information calculation unit 511 acquires the disc identifier DID from the optical disc 10. Then, the recording position information calculation unit 511 calculates the recording position information PI, with use of the disc identifier DID thus acquired and the apparatus identifier ID stored in the apparatus identifier storage unit 211.

As described above, Embodiment 5 employs a combination of two types of identifiers. In this way, recording position information PI of an apparatus becomes unique to the apparatus, preventing the recording position information PI of the apparatus from coincidentally matching recording position information PI of another apparatus. This further enhances security in using the content CDT.

Also, Embodiment 5 has the following advantageous effect. Suppose that a plurality of apparatuses attempt to use the same optical disc. In this case, each of the apparatuses generates the recording position information PI having a different value. This is because although the disc identifier DID is the same, the apparatus identifier ID of each apparatus is different. As a result, fraudulent activities such as using the same optical disc in a plurality of apparatuses are prevented.

(Embodiment 6)

The following describes Embodiment 6 according to the present invention.

Figure 24:
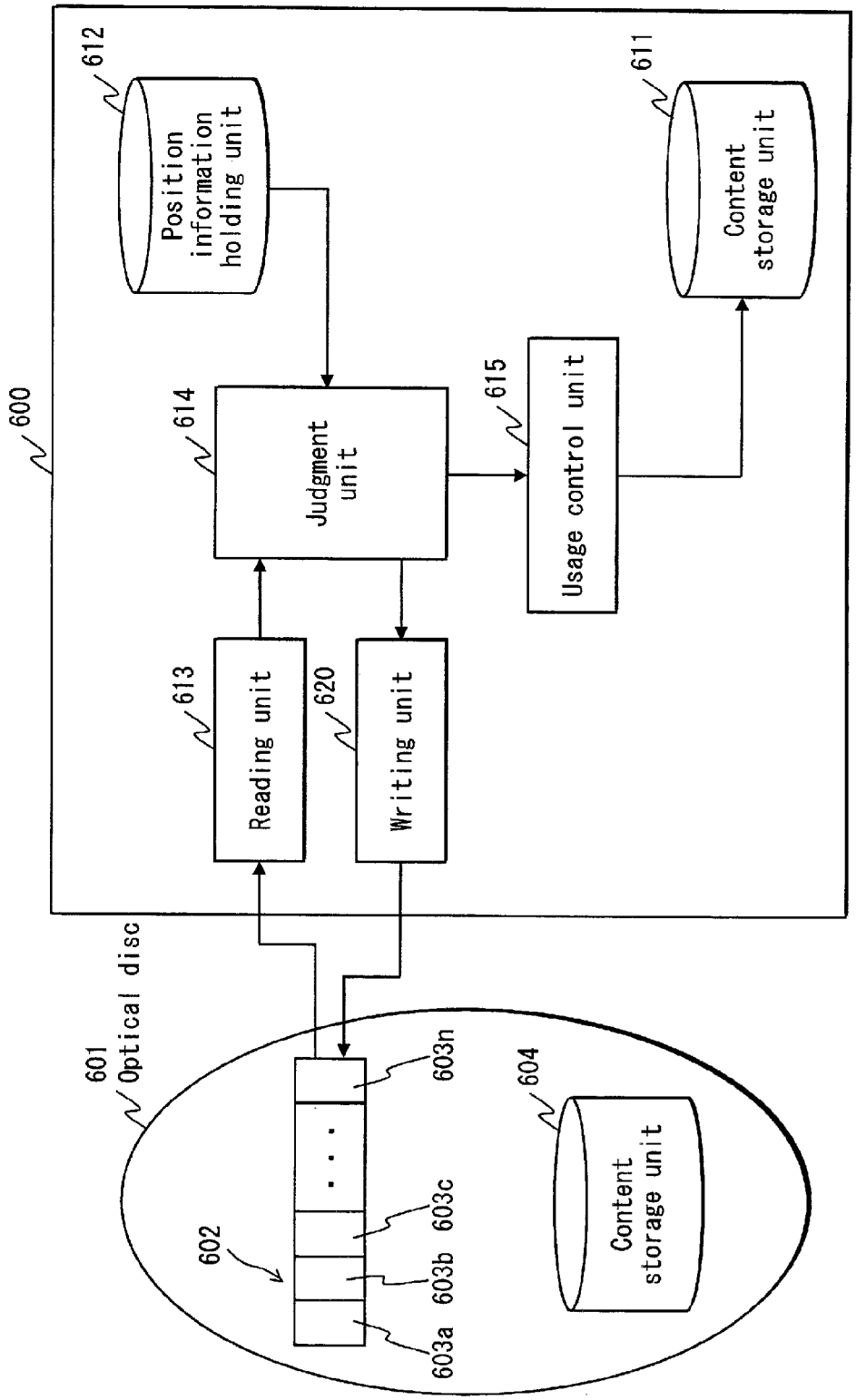
FIG. 24 shows a structure of an apparatus 600 according to Embodiment 6 of the present invention.

FIG. 24 shows the structure of a content control system according to Embodiment 6. As shown in FIG. 24, the content control system according to Embodiment 6 includes an apparatus 600 and an optical disc 601. The optical disc 601 has content recorded thereon. The apparatus 600 uses the content on the optical disc 601.

Embodiment 6 describes the "use of content" by the apparatus 600, with a specific example of installing the content recorded on the optical disc 601 into a recording area in the apparatus 600. First, the apparatus 600 reads the content from the optical disc 601, and stores the content in its own recording area. At this point, the content is in the state of not being permitted for use. Then, the apparatus 600 performs usage permission judgment to judge whether the use of the content is permitted. If judging that the use of the content is "permitted", the apparatus 600 changes the state of the content from a "usage non-permission state" in which the use of the content is not permitted to a "usage permission state" in which the use of the content is permitted, and ends installing processing.

The following describes details of Embodiment 6, with reference to FIG. 24.

The optical disc 601 is, for example, a playback-only ROM disc, and includes a control information area 602 and a content storage unit 604.

The content storage unit 604 is located inside the general data area 102 described in Embodiment 1, and stores therein content.

The control information area 602 is located inside the lead-in area 101 described in Embodiment 1, and is composed of a plurality of partial areas 603a, 603b, 603c, . . . , 603n. Each of the partial areas is, for example, an area in which 1-bit information is recordable, and into which control information is recorded by an apparatus. The control information corresponds to the "usage completion signal" described in Embodiment 1.

According to Embodiment 1, the usage completion signal is used to perform usage controls, such as "enabling only a single apparatus to play back the content" and "enabling only a single apparatus to copy the content onto a memory".

Embodiment 6 describes a case where the content on the optical disc 601 is installed into an apparatus. Therefore, in Embodiment 6, control information stored in the control information area 602 is used to realize the usage control of "enabling only a single apparatus to install the content". In other words, according to the present embodiment, once the apparatus 600 has installed the content on the optical disc 601, another apparatus cannot install the content on the optical disc 601 even if the optical disc 601 is inserted in the other apparatus.

As shown in FIG. 24, the apparatus 600 includes a content storage unit 611, a position information holding unit 612, a reading unit 613, a judgment unit 614, a usage control unit 615, and a writing unit 620.

The content storage unit 611 stores the content acquired from the optical disc 601. As described above, according to the present embodiment, the content is stored in the content storage unit 611 in the usage permission state where the use of the content is not permitted. To place the content in the usage permission state, the usage permission flag UF may be used in the same manner as in Embodiment 3.

The position information holding unit 612 holds position information for specifying a partial area into which the apparatus 600 is to record the control information, from among the plurality of partial areas included in the control information area 602 on the optical disc 601.

The reading unit 613 reads information within the control information area 602 of the optical disc 601.

The judgment unit 614 judges whether the use of the content stored in the content storage unit 611 is permitted, with use of the information read by the reading unit 613 and the position information held in the position information holding unit 612. If judging that the use of the content is permitted, the judgment unit 614 outputs a permission signal to the usage control unit 615. If judging that the use of the content is not permitted, the judgment unit 614 outputs an error signal to the usage control unit 615.

Upon receiving the permission signal from the judgment unit 614, the usage control unit 615 changes the state of the content stored in the content storage unit 611 to the usage permission state. Upon receiving the error signal from the judgment unit 614, the usage control unit 615 maintains the state of the content stored in the content storage unit 611 in the usage non-permission state. The usage control unit 615 uses the content when the content is placed in the usage permission state.

The writing unit 620 writes the control information in a partial area in the control information area 602 of the optical disc 601. For example, the writing unit 620 may write the control information by either using BCA (Burst Cutting Area) technology or using a read-only laser. In other words, the writing unit 620 is feasible as long as it includes a function of writing the control information by physically and irreversibly altering a layer on the optical disc 601.

Figure 25:
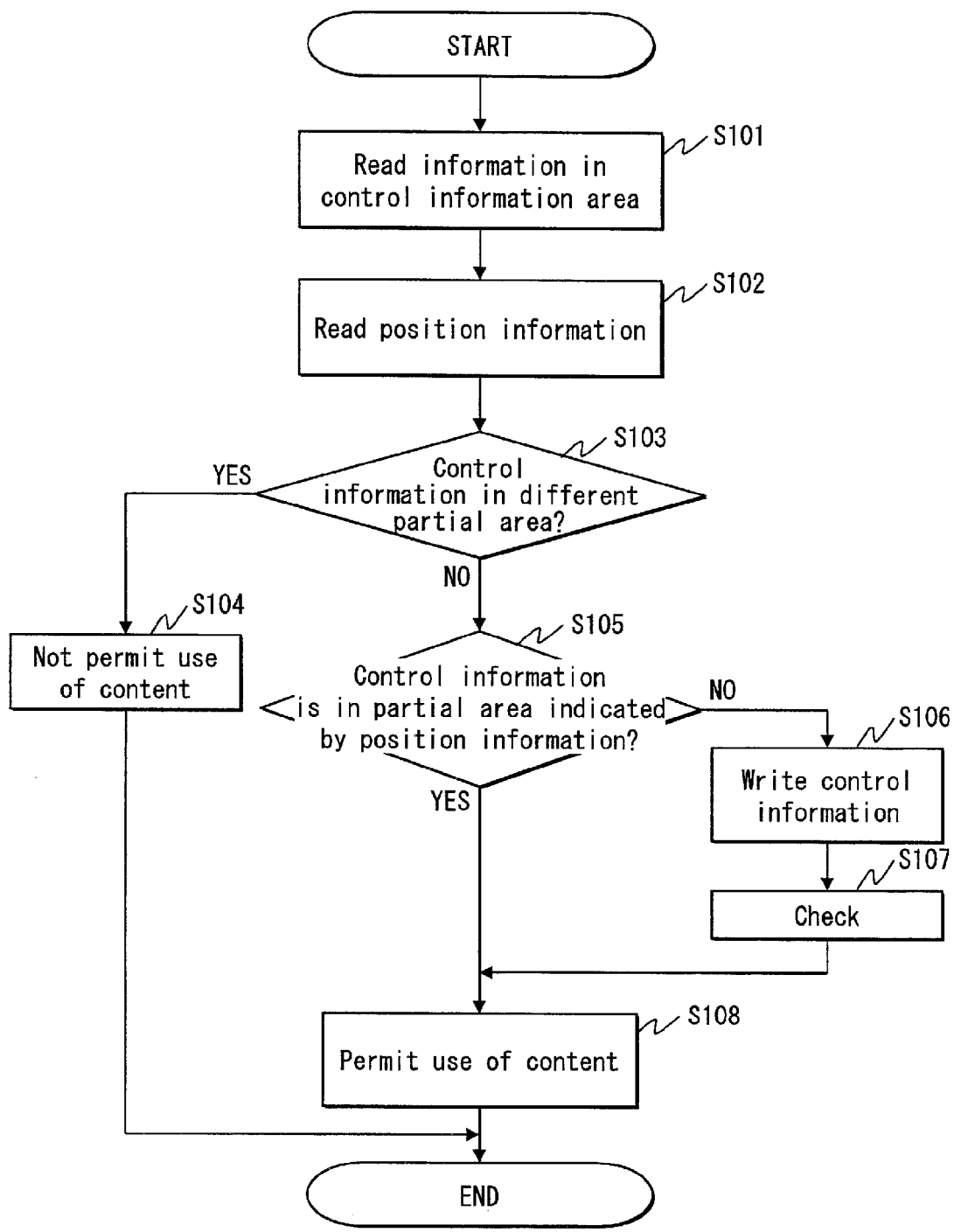
FIG. 25 shows a processing flow of the apparatus 600 according to Embodiment 6 of the present invention.

FIG. 25 shows a processing flow of the apparatus 600.

The reading unit 613 of the apparatus 600 reads information from the control information area 602 of the optical disc 601 (step S101). Upon reading the information, the reading unit 613 outputs the information to the judgment unit 614. Next, the judgment unit 614 reads position information from the position information holding unit 612 (step S102).

Then, the judgment unit 614 judges whether the control information is recorded in a partial area of the control information area 602, other than the partial area indicated by the position information read in step S102 (step S103).

If the control information is recorded in a partial area other than the partial area indicated by the position information (YES in step S103), the judgment unit 614 judges that the use of the content is not permitted (step S104) since the content of the optical disc 601 has already been installed by another apparatus. Then, the judgment unit 614 outputs an error signal to the usage control unit 615.

If the control information is not recorded in a partial area other than the partial area indicated by the position information (NO in step S103), the judgment unit 614 judges whether the control information is recorded in the partial area indicated by the position information (step S105).

If the control information is not recorded even in the partial area indicated by the position information (NO in step S105), the judgment unit 614 outputs the position information to the writing unit 620 since the optical disc 601 is at the stage of being used for the first time. Upon receiving the position information from the judgment unit 614, the writing unit 620 writes the control information in the partial area indicated by the position information (step S106). Subsequently, the reading unit 613 reads information from within the control information area 602 and outputs the information to the judgment unit 614, and the judgment unit 614 checks whether the control information is correctly recorded in the partial area indicated by the position information (step S107). Upon completing the check, the judgment unit 614 judges that the use of the content is permitted, and outputs a permission signal to the usage control unit 615.

If the control information is recorded in the partial area indicated by the position information (YES in step S105), the judgment unit 614 determines that the installing processing was interrupted by a power cut. Accordingly, the judgment unit 614 judges that the use of the content is permitted, and outputs a permission signal to the usage control unit 615.

Only after receiving the permission signal from the judgment unit 614, the usage control unit 615 changes the state of the content stored in the content storage unit 611 to the usage permission state, and permits the use of the content (step S108).

Note that in Embodiment 6, it is assumed that the content storage unit 611 of the apparatus 600 has the content already stored therein before step S101 of FIG. 25. However, similarly to Embodiment 3, the apparatus 600 may read the content from the optical disc 601 after the judgment unit 614 judges that the use of the content is permitted, and store the content into the content storage unit 611. In this case, the apparatus 600 further includes a content acquisition unit configured to acquire the content from the optical disc 601, in the usage non-permission state where the use of the content is not permitted.

Also, Embodiment 6 gives a specific example of installing and using the content. However, the apparatus 600 may simply playback the content on the optical disc 601 without installing the content, similarly to Embodiment 1. In this case, the content storage unit 611 shown in FIG. 24 is not necessary.

(Other Modifications)

Although the present invention has been described based on the above embodiments, the present invention is of course not limited to such. For example the following modifications are possible.

(1) Specifically, each of the above devices is a computer system including at least some of a microprocessor, a ROM, a RAM, a hard disk unit, a display unit, a keyboard, a mouse, etc. A computer program is stored on the RAM or the hard disk unit. Each of the devices achieves its functions by the microprocessor operating according to the computer program. Here, in order to achieve predetermined functions, the computer program is composed of a combination of multiple command codes that indicate instructions for the computer.

(2) Furthermore, part or all of the components of each of the aforementioned devices may be composed of one system LSI (Large Scale Integration). A system LSI is a super-multifunctional LSI manufactured by integrating multiple components on one chip and, more specifically, is a computer system including a microprocessor, a ROM, a RAM, and the like. A computer program is stored in the RAM. The system LSI achieves its functions by the microprocessor operating according to the computer program.

(3) Part or all of the components of each of the aforementioned devices may be composed of a single module, or an IC card detachable from each device. The IC card or the module is a computer system composed of a microprocessor, a ROM, a RAM, or the like. The IC card or the module may include the aforementioned super-multifunctional LSI. The IC card or the module achieves its functions by the microprocessor operating according to a computer program. The IC card or the module may be tamper-resistant.

(4) The present invention may be realized by the methods illustrated in the flowcharts in the above embodiments. The present invention may be a computer program for realizing these methods using a computer. The present invention may also be a computer-readable recording medium on which the aforementioned computer program is recorded. Examples of the computer-readable recording medium include a flexible disk, a hard disk, a CD-ROM, an MO, a DVD, a DVD-ROM, a DVD-RAM, a BD (Blu-ray Disc), and a semiconductor memory.

(5) The above embodiments have been described with use of a DVD-ROM as an example of an optical disc on which content is recorded. However, the present invention is not limited to such. For example, it is possible to use a BD-ROM or a CD-ROM. Furthermore, the present invention is not limited to using a playback-only ROM optical disc. The present invention is feasible as long as it is an apparatus that includes information for specifying the recording position of the usage completion signal on a package medium on which content is recorded.

(6) The present invention may be any combination of the above embodiments and modifications.

Industrial Applicability

The present invention is applicable in the industry for manufacturing and marketing apparatuses that use content recorded on an optical disc, and is usable as technology for correctly performing usage control of the content even if processing is interrupted by a power cut. Furthermore, the present invention is applicable in the industry for recording content on optical discs and marketing the optical discs, and is usable as technology for preventing unauthorized use of the content.

REFERENCE SIGNS LIST 1 content control system
10 optical disc
11 apparatus
101 lead-in area
102 general data area
111 optical disc input/output unit
112 usage control information acquisition unit
113 recording position information storage unit
114 usage permission judgment unit
115 disc identifier storage unit
116 disc identifier recording unit
117 usage control information writing unit
118 usage control information check unit
119 content usage unit
200 apparatus
211 apparatus identifier storage unit
212 recording position information calculation unit
300 apparatus
301 content acquisition unit
302 content storage unit
303 content validation setting unit
400 apparatus
411 time-varying element generation unit
412 recording position information calculation unit
500 apparatus
511 recording position information calculation unit
600 apparatus
601 optical disc
602 control information area
603a-603n partial areas
604 content storage unit
611 content storage unit
612 position information holding unit
613 reading unit
614 judgment unit
615 usage control unit
620 writing unit
1011 disc identifier area
1012 usage control information area

The invention claimed is:

1. An apparatus for using content recorded on an optical disc, wherein
the optical disc includes a control information area that is composed of a plurality of partial areas, each being for recording control information indicating that use of the content is not permitted,
the apparatus comprises:
a position information holding unit holding therein position information indicating one of the partial areas that is allocated for the apparatus to record the control information;
a reading unit configured to read information within the control information area;
a judgment unit configured to judge whether use of the content is permitted, with use of the information read by the reading unit and the position information; and
a usage control unit configured to use the content when use of the content is judged to be permitted.

2. The apparatus of claim 1 wherein
the judgment unit judges that use of the content is not permitted when the control information is recorded in any of the partial areas other than the partial area indicated by the position information.

3. The apparatus of claim 1 wherein
the judgment unit judges that use of the content is permitted as an exception when the control information is recorded in the partial area indicated by the position information.

4. The apparatus of claim 1 wherein
the judgment unit judges that use of the content is permitted when the control information is not recorded in any of the partial areas,
the apparatus further comprises
a writing unit configured to write the control information in the partial area indicated by the position information, when use of the content is judged to be permitted, and
the usage control unit uses the content after the control information is written in the partial area indicated by the position information.

5. The apparatus of claim 4 further comprising:
a content acquisition unit configured to acquire, from the optical disc, the content in a non-permission state where use of the content is not permitted; and
a content storage unit configured to store the content in the non-permission state thus acquired, wherein
after the control information is written in the partial area indicated by the position information, the usage control unit changes a state of the content stored in the content storage unit, from the non-permission state to a permission state where use of the content is permitted, and thereafter uses the content.

6. The apparatus of claim 5 wherein
the writing unit writes the control information by physically and irreversibly altering a layer on the optical disc.

7. The apparatus of claim 6 wherein
the control information area is located within a lead-in area on the optical disc, and
the writing unit writes the control information with use of a laser, into the partial area located in the lead-in area on the optical disc.

8. The apparatus of claim 7 wherein
the optical disc is a ROM disc,
the control information area is located in a burst cutting area within the lead-in area, and
the writing unit writes the control information with use of burst cutting area technology, into the partial area located in the burst cutting area on the ROM disc.

9. The apparatus of claim 4 further comprising:
an identifier holding unit holding therein an apparatus identifier, which is a value unique to the apparatus; and
a position information calculation unit configured to calculate the position information with use of the apparatus identifier, and record the position information thus calculated into the position information holding unit.

10. The apparatus of claim 4 wherein
each partial area within the control information area is an area in which 1-bit information is recordable, and
the control information written by the writing unit has a size of 1 bit.

11. A content usage method used in an apparatus for using content recorded on an optical disc, wherein
the optical disc includes a control information area that is composed of a plurality of partial areas, each being for recording control information indicating that use of the content is not permitted,
the apparatus comprises a position information holding unit holding therein position information indicating one of the partial areas that is allocated for the apparatus to record the control information,
the content usage method comprises:
a reading step of reading information within the control information area;
a judgment step of judging whether use of the content is permitted, with use of the information read by the reading step and the position information; and
a usage control step of using the content when use of the content is judged to be permitted.

12. A computer-readable non-transitory recording medium storing thereon a computer program used in an apparatus for using content recorded on an optical disc, wherein
the optical disc includes a control information area that is composed of a plurality of partial areas, each being for recording control information indicating that use of the content is not permitted,
the apparatus comprises a position information holding unit holding therein position information indicating one of the partial areas that is allocated for the apparatus to record the control information,
the computer program causes the apparatus to perform:
a reading step of reading information within the control information area;
a judgment step of judging whether use of the content is permitted, with use of the information read by the reading step and the position information; and
a usage control step of using the content when use of the content is judged to be permitted.

13. An integrated circuit used in an apparatus for using content recorded on an optical disc, wherein
the optical disc includes a control information area that is composed of a plurality of partial areas, each being for recording control information indicating that use of the content is not permitted,
the integrated circuit comprises:
a position information holding unit holding therein position information indicating one of the partial areas that is allocated for the integrated circuit to record the control information;
a reading unit configured to read information within the control information area;
a judgment unit configured to judge whether use of the content is permitted, with use of the information read by the reading unit and the position information; and
a usage control unit configured to use the content when use of the content is judged to be permitted.

14. An apparatus for using content recorded on an optical disc, wherein
the optical disc includes a disc identifier area and a control information area, the disc identifier area being for holding a disc identifier specifying the optical disc, the control information area being composed of a plurality of partial areas, each being for recording control information indicating that use of the content is not permitted,
the apparatus comprises:
a disc identifier holding unit configured to hold therein an acquired disc identifier specifying an optical disc on which content, use of which is permitted, is recorded;
a position information holding unit holding therein position information indicating one of the partial areas that is allocated for the apparatus to record the control information;
an identifier reading unit configured to read the disc identifier from the disc identifier area of the optical disc;
a first judgment unit configured to judge whether the control information is recorded in any of the partial areas other than the partial area indicated by the position information;
a second judgment unit configured, when the first judgment unit judges negatively, to judge whether the control information is recorded in the partial area indicated by the position information;
a third judgment unit configured, when the second judgment unit judges affirmatively, to judge whether the disc identifier read by the identifier reading unit is held in the disc identifier holding unit; and
a usage control unit configured to use the content when the second judgment unit judges negatively and also the third judgment unit judges affirmatively.

15. The apparatus of claim 14 further comprising:
a writing unit configured, when the second judgment unit judges negatively, to write the control information in the partial area indicated by the position information; and
a disc identifier recording unit configured to write, as the acquired disc identifier, the disc identifier read by the reading unit into the disc identifier holding unit, wherein
the usage control unit uses the content after the control information is written in the partial area indicated by the position information.

16. The apparatus of claim 15 further comprising:
a content acquisition unit configured to acquire, from the optical disc, the content in a non-permission state where use of the content is not permitted; and
a content storage unit configured to store the content in the non-permission state thus acquired, wherein
after the control information is written in the partial area indicated by the position information, the usage control unit changes a state of the content stored in the content storage unit, from the non-permission state to a permission state where use of the content is permitted, and thereafter uses the content.

17. The apparatus of claim 16 wherein
the writing unit writes the control information by physically and irreversibly altering a layer on the optical disc.

18. The apparatus of claim 17 wherein
the control information area is located within a lead-in area on the optical disc, and
the writing unit writes the control information with use of a laser, into the partial area located in the lead-in area on the optical disc.

19. The apparatus of claim 18 wherein
the optical disc is a ROM disc,
the control information area is located in a burst cutting area within the lead-in area, and
the writing unit writes the control information with use of burst cutting area technology, into the partial area located in the burst cutting area on the ROM disc.

20. The apparatus of claim 14 further comprising:
an identifier holding unit holding therein an apparatus identifier, which is a value unique to the apparatus; and
a position information calculation unit configured to calculate the position information with use of the apparatus identifier, and record the position information thus calculated into the position information holding unit.

21. The apparatus of claim 14 wherein
each partial area within the control information area is an area in which 1-bit information is recordable, and
the control information written by the writing unit has a size of 1 bit.

22. A content usage method used in an apparatus for using content recorded on an optical disc, wherein
the optical disc includes a disc identifier area and a control information area, the disc identifier area being for holding a disc identifier specifying the optical disc, the control information area being composed of a plurality of partial areas, each being for recording control information indicating that use of the content is not permitted,
the apparatus comprises:
a disc identifier holding unit configured to hold therein an acquired disc identifier specifying an optical disc on which content, use of which is permitted, is recorded; and
a position information holding unit holding therein position information indicating one of the partial areas that is allocated for the apparatus to record the control information,
the content usage method comprises:
an identifier reading step of reading the disc identifier from the disc identifier area of the optical disc;
a first judgment step of judging whether the control information is recorded in any of the partial areas other than the partial area indicated by the position information;
a second judgment step of, when the first judgment step judges negatively, judging whether the control information is recorded in the partial area indicated by the position information;
a third judgment step of, when the second judgment step judges affirmatively, judging whether the disc identifier read by the identifier reading step is held in the disc identifier holding unit; and
a usage control step of using the content when the second judgment step judges negatively and also the third judgment step judges affirmatively.

23. A computer-readable non-transitory recording medium storing thereon a computer program used in an apparatus for using content recorded on an optical disc, wherein
the optical disc includes a disc identifier area and a control information area, the disc identifier area being for holding a disc identifier specifying the optical disc, the control information area being composed of a plurality of partial areas, each being for recording control information indicating that use of the content is not permitted,
the apparatus comprises:
a disc identifier holding unit configured to hold therein an acquired disc identifier specifying an optical disc on which content, use of which is permitted, is recorded; and
a position information holding unit holding therein position information indicating one of the partial areas that is allocated for the apparatus to record the control information,
the computer program causes the apparatus to perform:
an identifier reading step of reading the disc identifier from the disc identifier area of the optical disc;
a first judgment step of judging whether the control information is recorded in any of the partial areas other than the partial area indicated by the position information;
a second judgment step of, when the first judgment step judges negatively, judging whether the control information is recorded in the partial area indicated by the position information;
a third judgment step of, when the second judgment step judges affirmatively, judging whether the disc identifier read by the identifier reading step is held in the disc identifier holding unit; and
a usage control step of using the content when the second judgment step judges negatively and also the third judgment step judges affirmatively.

24. An integrated circuit used in an apparatus for using content recorded on an optical disc, wherein
the optical disc includes a disc identifier area and a control information area, the disc identifier area being for holding a disc identifier specifying the optical disc, the control information area being composed of a plurality of partial areas, each being for recording control information indicating that use of the content is not permitted,
the integrated circuit comprises:
a disc identifier holding unit configured to hold therein an acquired disc identifier specifying an optical disc on which content, use of which is permitted, is recorded;
a position information holding unit holding therein position information indicating one of the partial areas that is allocated for the integrated circuit to record the control information;
an identifier reading unit configured to read the disc identifier from the disc identifier area of the optical disc;
a first judgment unit configured to judge whether the control information is recorded in any of the partial areas other than the partial area indicated by the position information;
a second judgment unit configured, when the first judgment unit judges negatively, to judge whether the control information is recorded in the partial area indicated by the position information;
a third judgment unit configured, when the second judgment unit judges affirmatively, to judge whether the disc identifier read by the identifier reading unit is held in the disc identifier holding unit; and a usage control unit configured to use the content when the second judgment unit judges negatively and also the third judgment unit judges affirmatively.

\* \* \* \* \*